(12) United States Patent
Maruhashi

(10) Patent No.: US 11,514,308 B2
(45) Date of Patent: *Nov. 29, 2022

(54) METHOD AND APPARATUS FOR MACHINE LEARNING

(71) Applicant: FUJITSU LIMITED, Kawasaki (JP)

(72) Inventor: Koji Maruhashi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 1119 days.

This patent is subject to a terminal disclaimer.

(21) Appl. No.: 16/125,420

(22) Filed: Sep. 7, 2018

(65) Prior Publication Data

US 2019/0080236 A1    Mar. 14, 2019

(30) Foreign Application Priority Data

Sep. 8, 2017 (JP) .............................. JP2017-172626

(51) Int. Cl.
*G06N 3/08* (2006.01)
*G06K 9/62* (2022.01)
*G06N 3/04* (2006.01)

(52) U.S. Cl.
CPC ............. *G06N 3/08* (2013.01); *G06K 9/6262* (2013.01); *G06N 3/04* (2013.01); *G06N 3/0454* (2013.01); *G06N 3/084* (2013.01); *G06K 9/6255* (2013.01)

(58) Field of Classification Search
CPC .................................. G06N 3/08; G06F 17/18
USPC ................................ 705/310, 7.35; 707/723
See application file for complete search history.

(56) References Cited

U.S. PATENT DOCUMENTS

2016/0224892 A1* 8/2016 Sawada .................... G06N 3/08
2019/0080235 A1   3/2019 Maruhashi

FOREIGN PATENT DOCUMENTS

| JP | 7-319844 A | 12/1995 |
|---|---|---|
| JP | 8-249303 A | 9/1996 |
| JP | 8-329196 | 12/1996 |
| JP | 9-81535 | 3/1997 |
| JP | 9-90981 | 4/1997 |

(Continued)

OTHER PUBLICATIONS

Niepert, M., et al. "Learning Convolutional Neural Networks for Graphs", Proceedings of the 33rd International Conference on Machine Learning (ICML 2016), 2016, 10 pages.

(Continued)

*Primary Examiner* — Kiet M Doan
(74) *Attorney, Agent, or Firm* — Xsensus LLP

(57) ABSTRACT

A machine learning apparatus calculates second values, based on first values each assigned to one variable value of each term in relation to a neuron in a layer following an input layer of a neural network, where the second values are assigned to variable-value combination patterns in relation to each following-layer neuron. Each second value is represented by a product of first values each assigned to a variable value included in the combination pattern in relation to the following-layer neuron. The apparatus then applies the second values as weights each to a numerical value when it is entered to the corresponding following-layer neuron, to calculate an output value of the neural network with the numerical values arranged in an input order. The apparatus updates reference values in a reference pattern and the first values based on input error that the output value exhibits with respect to training data.

5 Claims, 26 Drawing Sheets

(56) References Cited

FOREIGN PATENT DOCUMENTS

| JP | 9-138786 | 5/1997 |
|----|----------|--------|
| JP | 11-224106 | 8/1999 |
| JP | 2002-222409 A | 8/2002 |

OTHER PUBLICATIONS

U.S. Office Action dated Jul. 5, 2022 for corresponding U.S. Appl. No. 16/125,395, 36 pp.

D-S. Chen et al., "An Improved ART neural net for machine call formation", Journal of Materials Processing Technology 61.1-2 (1996): 1-6, (Year: 1996), 6 pp.

Carpenter, Gail A. et al., "Adaptive resonance theory." (2010): 22-35, 17 pp.

Stackoverflow, "Neural Network Categorization: Do They Always Have to Have One Label per Training Data." Stack Overflow, Nov. 1, 1964, https://stackoverflow.com/questions/42563961/neural-network-categorization-do-they-always-have-to-have-one-label-per-trainin. (Year: 2017).

\* cited by examiner

METHOD AND APPARATUS FOR MACHINE LEARNING

CROSS-REFERENCE TO RELATED APPLICATION

This application is based upon and claims the benefit of priority of the prior Japanese Patent Application No. 2017-172626, filed on Sep. 8, 2017, the entire contents of which are incorporated herein by reference.

FIELD

The embodiments discussed herein relate to a machine learning method and a machine learning apparatus.

BACKGROUND

Artificial neural networks are a computational model used in machine learning. For example, a computer performs supervised machine learning by entering input data for learning to the input layer of a neural network. The computer then causes each neural unit in the input layer to perform a predefined processing task on the entered input data, and passes the processing results as inputs to neural units in the next layer. When the input data is thus propagated forward and reaches the output layer of the neural network, the computer generates output data from the processing result in that layer. The computer compares this output data with correct values specified in labeled training data associated with the input data and modifies the neural network so as to reduce their differences, if any. The computer repeats the above procedure, thereby making the neural network learn the rules for classifying given input data at a specific accuracy level. Such neural networks may be used to classify a communication log collected in a certain period and detect a suspicious activity that took place during that period.

It is a characteristic of neural networks to suffer from poor generalization or overtraining (also termed "overfitting") when each training dataset entered to a neural network contains too many numerical values in relation to the total number of training datasets (i.e., sample size). Overtraining is the situation where a learning classifier has learned something overly specific to the training datasets, thus achieving high classification accuracy on the training datasets but failing to generalize beyond the training datasets and make accurate predictions with new data. Neural network training may adopt a strategy to avoid such overtraining.

One example of neural network-based techniques is a character recognition device that recognizes text with accuracy by properly classifying input character images. Another example is a high-speed learning method for neural networks. The proposed method prevents oscillatory modification of a neural network by using differential values, thus achieving accurate learning. Yet another example is a learning device for neural networks that is designed for quickly processing multiple training datasets evenly, no matter whether an individual training dataset works effectively, what categories their data patterns belong to, or how many datasets are included in each category. Still another example is a technique for learning convolutional neural networks. This technique orders neighboring nodes of each node in graph data and assigns equal weights to connections between those neighboring nodes.

One example of technology concerned with teaching computers to learn is a model learning method for pattern recognition to improve learning efficiency. Another example is a parameter estimation apparatus employing a neural network to perform, for example, practicable air-fuel ratio control even in the case of receiving an input pattern different from one learned from input parameter values during the learning phase, thus ensuring the stability of the neural network.

Japanese Laid-open Patent Publication No. 8-329196
Japanese Laid-open Patent Publication No. 9-81535
Japanese Laid-open Patent Publication No. 9-138786
Japanese Laid-open Patent Publication No. 9-90981
Japanese Laid-open Patent Publication No. 11-224106
Mathias Niepert et al., "Learning Convolutional Neural Networks for Graphs," Proceedings of the 33rd International Conference on Machine Learning (ICML 2016), June 2016

In some cases of learning a neural network model of relationships between individuals or objects, the order of values entered to the input layer may affect output values that the output layer yields. That is to say, if the values entered to the input layer are inappropriately ordered, the network model may suffer from poor classification accuracy. This means that the input values have to be arranged in a proper order to achieve accurate machine learning. If, however, input data contains a large number of values, it is not an easy task to determine a proper input order of these values. In addition, the abundance of input values may cause overtraining, thus compromising the classification accuracy.

SUMMARY

In one aspect, there is provided a non-transitory computer-readable storage medium storing therein a machine learning program that causes a computer to execute a process including: obtaining an input dataset including a plurality of numerical values and a training label indicating a correct classification result corresponding to the input dataset; determining an input order of the plurality of numerical values based on a reference pattern, by associating each of the plurality of numerical values with one of combination patterns of respective variable values of a plurality of terms, the reference pattern including an array of reference values to provide a criterion for ordering the plurality of numerical values to be entered to a neural network, the reference values being associated one-to-one with the combination patterns; determining second parameter values, based on first parameter values each assigned to one of the respective variable values of each of the plurality of terms in relation to each neuron in a layer immediately following an input layer of the neural network, the second parameter values being assigned one-to-one to the combination patterns in relation to each neuron in the immediately following layer, each of the second parameter values serving as a weight value to be applied to a numerical value associated with the corresponding combination pattern when the numerical value is entered to the corresponding neuron in the immediately following layer, and being represented by a product of first parameter values each assigned to one of the respective variable values included in the combination pattern in relation to the neuron in the immediately following layer; calculating an output value of the neural network with the plurality of numerical values arranged in the input order, by use of the second parameter values; calculating an input error in each of the input layer and the immediately following layer, based on a difference between the output value and the correct classification result indicated by the training label; and updating the reference values in the reference pattern and the first parameter values based on the input error in each of the input layer and the immediately following layer.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings. These embodiments may be combined with each other, unless they have contradictory features.

(a) First Embodiment

The description begins with a machine learning apparatus according to a first embodiment.

Figure 1:
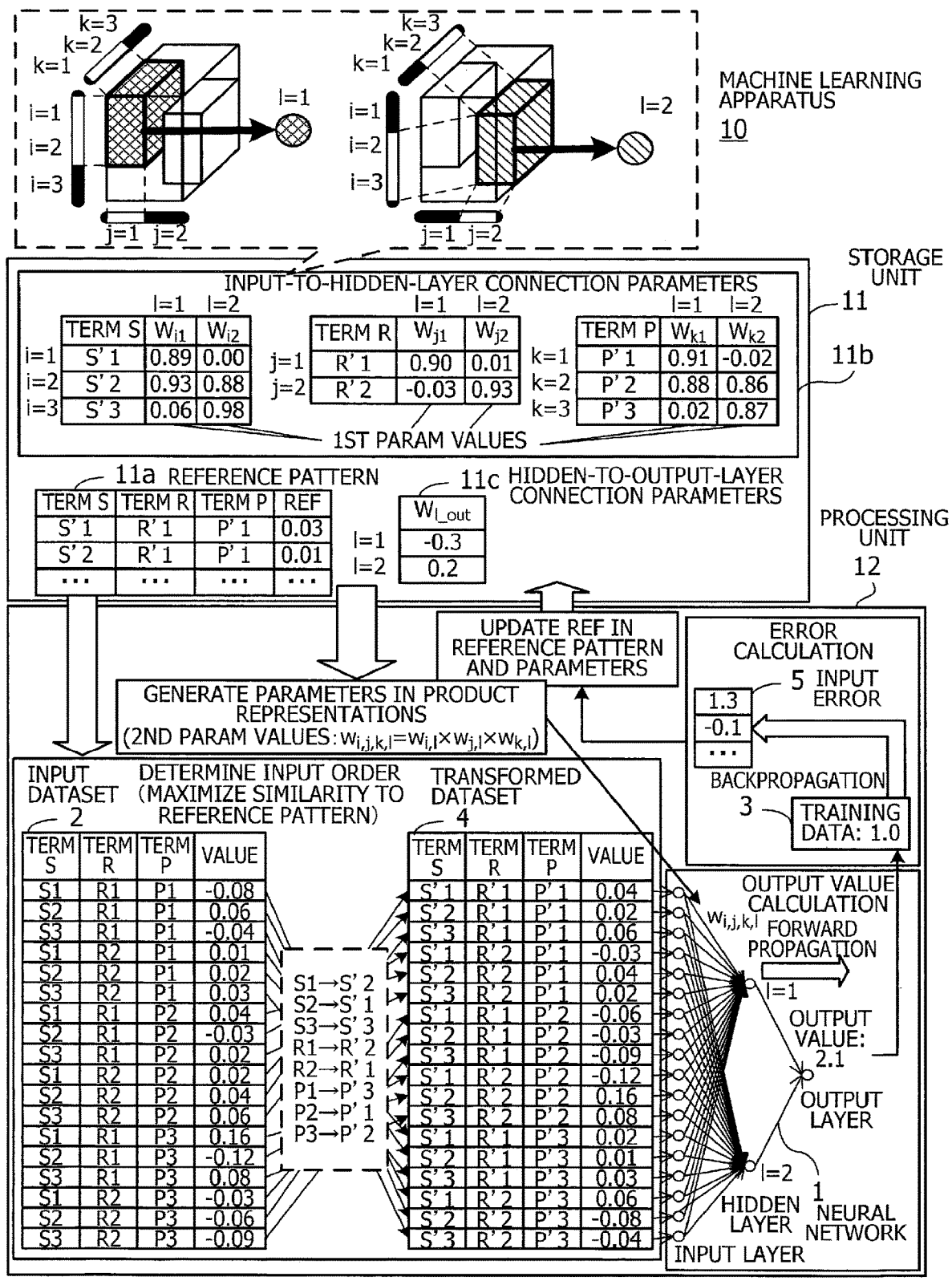
FIG. 1 illustrates an example of a machine learning apparatus according to a first embodiment.

FIG. 1 illustrates an example of a machine learning apparatus according to the first embodiment. An illustrated machine learning apparatus 10 includes a storage unit 11 and a processing unit 12. For example, this machine learning apparatus 10 may be a computer. The storage unit 11 may be implemented as part of, for example, a memory or other storage device in the machine learning apparatus 10. The processing unit 12 may be implemented as, for example, a processor in the machine learning apparatus 10.

The storage unit 11 stores therein a reference pattern 11a and parameters of a neural network 1. The reference pattern 11a includes an array of reference values corresponding one-to-one to all combination patterns of respective variable values of multiple terms (Terms S, R, and P in the example of FIG. 1), to provide a criterion for ordering numerical values before they are entered to the neural network 1 for the purpose of classifying data. A neural network is typically made up of an input layer, one or more hidden layers, and an output layer, and only one hidden layer is illustrated in the neural network 1 of FIG. 1. The storage unit 11 also stores therein parameters assigned to connections between the inner layer and the hidden layer (input-to-hidden-layer connection parameters 11b) and parameters assigned to connections between the hidden layer and the output layer (hidden-to-output-layer connection parameters 11c).

The processing unit 12 obtains an input dataset 2 and its associated training data 3 (also referred to as a "training label" or "supervisory signal") indicating a correct classification result corresponding to the input dataset 2. The input dataset 2 includes a set of numerical input values that are, for example, individually given to each combination pattern of input variable values of the terms (Terms S, R, and P). Two or more input variable values of the same single term in the input dataset 2 may correlate with each other in terms of the numerical values individually associated with combination patterns each including one of the correlating input variable values.

Suppose, for example, that the input dataset 2 is a collection of observational results on communication events over networks, and includes three terms named source host, destination host, and port. The source host term has input variable values each being the identifier of a specific host device that serves as a source entity in packet communication events. The destination host term has input variable values each being the identifier of a specific host device that serves as a destination entity in packet communication events. The port term has input variable values each being the port number of a port at which packets were received on its corresponding destination host in packet communication events. Each record in the input dataset 2 corresponds to a specific combination of a source host, a destination host, and a port, which are individually denoted by their corresponding input variable values. In the other words, the input dataset 2 is made up of records individually corresponding to different combinations of respective input variable values of the terms. Further, in the input dataset 2, each combination of respective input variable value is assigned a numerical input value that indicates the communication frequency between the corresponding source and destination hosts using the corresponding port. Such combinations individually represent relationships among their input variable values. In the case where, for example, two or more source hosts frequently transmit packets to the same single destination host using the same single port, these source hosts are considered to be correlated with one another.

Existing correlation patterns, each between two or more input variable values of the same single term in the input dataset 2, may strongly affect learning results of the neural network 1. In such a case, overtraining of the neural network 1 is prevented if the number of parameters in the neural network 1 is reduced while characteristics of the existing correlation patterns are preserved.

To this end, first parameter values (1ST SARAN VALUES in FIG. 1) are provided as values of the input-to-hidden-layer connection parameters 11b. Each of the first parameter values is assigned to one of variable values of a single term (amongst Terms S, R, and P) in relation to one of neurons in the hidden layer of the neural network 1. Supposing that Term S has three variable values, Term R has two variable values, and Term P has three variable values, sixteen first parameter values are provided. The number of first parameter values is less than the total number of numerical values individually entered to the neurons in the hidden layer (18×2=36). Accordingly, in order to define weights applied to the numerical values individually entered to the hidden-layer neurons in the course of calculating an output value of the neural network 1, second parameters are used, each of which is represented as a product of corresponding first parameter values. Details of the machine learning procedure using the neural network 1 will now be described below.

After obtaining the input dataset 2 and its associated training data 3, the processing unit 12 determines an input order of the numerical input values included in the input dataset 2 by associating the numerical input values one-to-one with combination patterns given in the reference pattern 11a. For example, the processing unit 12 transforms each of the input variable values into one of variable values used in the reference pattern 11a and then rearranges combination patterns of the transformed variable values based on the reference pattern 11a, thus yielding a transformed dataset 4. The processing unit 12 adopts the order of numerical values presented in the transformed dataset 4 as an input order of the numerical input values.

On this occasion, the processing unit 12 determines the input order of the numerical input values in such a way that the array of numerical input values in the transformed dataset 4 will exhibit a maximum similarity to the array of the reference values indicated in the reference pattern 11a. For example, the processing unit 12 generates a first vector by arranging the numerical input values, as its first element to its last element, in the order of their entry. The reference pattern 11a, on the other hand, has a set of reference values, which form a second vector. The processing unit 12 finalizes the order of entry of the numerical input values by modifying the order of elements in the first vector such that the inner product of the first and second vectors is maximized.

Subsequently, the processing unit 12 determines, based on the first parameter values, second parameter values assigned one-to-one to the combination patterns in relation to each neuron in a layer immediately following the input layer (i.e., hidden layer). Each of the second parameter values indicates a weight value applied to a numerical input value associated with the assigned combination pattern when the numerical input value is entered to the assigned neuron in the hidden layer. For example, the processing unit 12 adopts, as each second parameter value, a product of first parameter values each assigned to one of the variable values included in the assigned combination pattern in relation to the assigned neuron in the hidden layer.

Next, in accordance with the determined input order, the processing unit 12 enters the rearranged numerical input values to the neural network 1. The processing unit 12 then calculates an output value of the neural network 1 on the basis of the entered numerical input values. Referring to FIG. 1, the input-layer neural units are arranged in the vertical direction, in accordance with the order of numerical input values entered to the neural network 1. That is, the topmost neural unit receives the first numerical input value, and the bottommost neural unit receives the last numerical input value. Each neural unit in the input layer is supposed to receive a single numerical input value. In the calculation of the output value, the processing unit 12 uses each second parameter value, which is assigned to a combination pattern in relation to a neuron in the hidden layer (i.e., the layer immediately following the input layer), as a weight value applied to a numerical input value associated with the assigned combination pattern in the transformed dataset 4 when the numerical input value is entered to the assigned neuron in the hidden layer.

The processing unit 12 now calculates an output error that the output value exhibits with respect to the training data 3, and then calculates, based on the output error, input error 5 in each of the input layer and the hidden layer of the neural network 1 for the purpose of correcting the neural network 1. For example, the processing unit 12 calculates the input error 5 by performing backward propagation (also known as "backpropagation") of the output error over the neural network 1.

Based on the input error in the input layer calculated above, the processing unit 12 updates a set of reference values in the reference pattern 11a. For example, the processing unit 12 selects the reference values in the reference pattern 11a one by one for the purpose of modification described below. That is, the processing unit 12 performs the following processing operations with each selected reference value.

The processing unit 12 creates a temporary reference pattern (not illustrated in FIG. 1) by temporarily increasing or decreasing the selected reference value by a specified amount. Based on this temporary reference pattern, the processing unit 12 then determines a tentative order of numerical input values. For example, the processing unit 12 rearranges numerical input values given in the input dataset 2 in such a way that the resulting order will exhibit a maximum similarity to the temporary reference pattern, thus generating a transformed dataset corresponding to the selected reference value. Subsequently the processing unit 12 calculates a difference of numerical values between the input order determined with the original reference pattern 11a and the tentative input order determined with the temporary reference pattern.

The processing unit 12 then determines whether to increase or decrease the selected reference value in the reference pattern 11a, on the basis of the input error in the input layer and the difference calculated above. For example, the processing unit 12 treats the input error as a third vector and the above difference in numerical values as a fourth vector. The processing unit 12 determines to what extent it needs to raise or reduce the selected reference value, on the basis of an inner product of the third and fourth vectors.

As noted above, the selected reference value has temporarily been increased or decreased by a specified amount. In the former case, the processing unit 12 interprets a positive inner product as suggesting that the selected reference value needs to be reduced, and a negative inner product as suggesting that the selected reference value needs to be raised. In the latter case, the processing unit 12 interprets a positive inner product as suggesting that the selected reference value needs to be raised, and a negative inner product as suggesting that the selected reference value needs to be reduced.

The processing unit 12 executes the above procedure for each individual reference value in the reference pattern 11a, thus calculating a full set of modification values. The processing unit 12 now updates the reference pattern 11a using the modification dataset. Specifically, the processing unit 12 applies the modification values to the reference values in the reference pattern 11a according to the above-noted interpretation of raising or reducing, thus obtaining an updated reference pattern. For example, the processing unit 12 multiplies the modification values by the step size (a) of the neural network 1 (e.g., α=2 in FIG. 1) and subtracts the resulting products from corresponding reference values in the reference pattern 11a.

Further, the processing unit 12 repeats the above-described updating process for the reference pattern until the amount of modification to reference values falls below a certain threshold (i.e., until the modification causes little difference between the reference pattern before update and the reference pattern after update). Finally, the processing unit 12 obtains the reference pattern 11a that gives a set of proper reference values for rearrangement of the input dataset 2.

The processing unit 12 also updates values of the input-to-hidden-layer connection parameters (the first parameter values) based on the input error in the hidden layer. Further, the processing unit 12 updates the hidden-to-output-layer connection parameters based on the output error calculated above. In the update of the first parameter values, if determining, through for example backward propagation, that it is appropriate to increase a second parameter value for the purpose of correcting the neural network 1, the processing unit 12 increases the first parameter values used to calculate the second parameter value. On the other hand, if determining that it is appropriate to decrease a second parameter value for the purpose of correcting the neural network 1, the processing unit 12 decreases the first parameter values used to calculate the second parameter value.

As can be seen from the above description, the first embodiment expresses each second parameter assigned to a combination of variable values of terms (a relationship among the variable values) in relation to a neuron in the hidden layer by using a product of parameters each assigned to one of the variable values included in the assigned combination in relation to the assigned neuron in the hidden layer. Herewith, it is possible to reduce the number of parameters between the input layer and the hidden layer, thereby successfully preventing overtraining.

The reduction in the number of parameters does not impair characteristics of an input dataset when the input dataset includes a large number of groups each made up of strongly correlated variable values of respective terms, and patterns of relationships of variable values between such groups are important characteristics for the data classification. Suppose, for example, that first and second variable values S'1 and S'2 of Term S, a first variable value R'1 of Term R, and first and second variable values P'1 and P'2 of Term P form a group of strongly correlated variable values. In this case, as a result of learning, a second parameter value assigned, in relation to a common neuron in the hidden layer (the first neuron in the example of FIG. 1), to each combination pattern consisting of variable values included in the group of the strongly correlated variable values takes a large value. This is expressed in the first parameter values respectively assigned to the strongly correlated variable values S'1, S'2, R'1, P'1, and P'2 in relation to the first neuron. As seen in the input-to-hidden-layer connection parameters 1b of FIG. 1, these first parameter values take larger values than others. That is, it is possible to represent relationships of variable values between groups of strongly correlated variable values, using a fewer number of parameters.

In the case where patterns of relationships of variable values between groups of strongly correlated variable values are important characteristics for the data classification, a reduction in the classification accuracy is prevented if characteristics indicating the relationships of variable values between such groups are preserved without loss. That is, the reduction in the number of parameters does not impair the classification accuracy.

(b) Second Embodiment

This part of the description explains a second embodiment. The second embodiment is intended to detect suspicious communication activities over a computer network by analyzing communication logs with a neural network.

Figure 2:
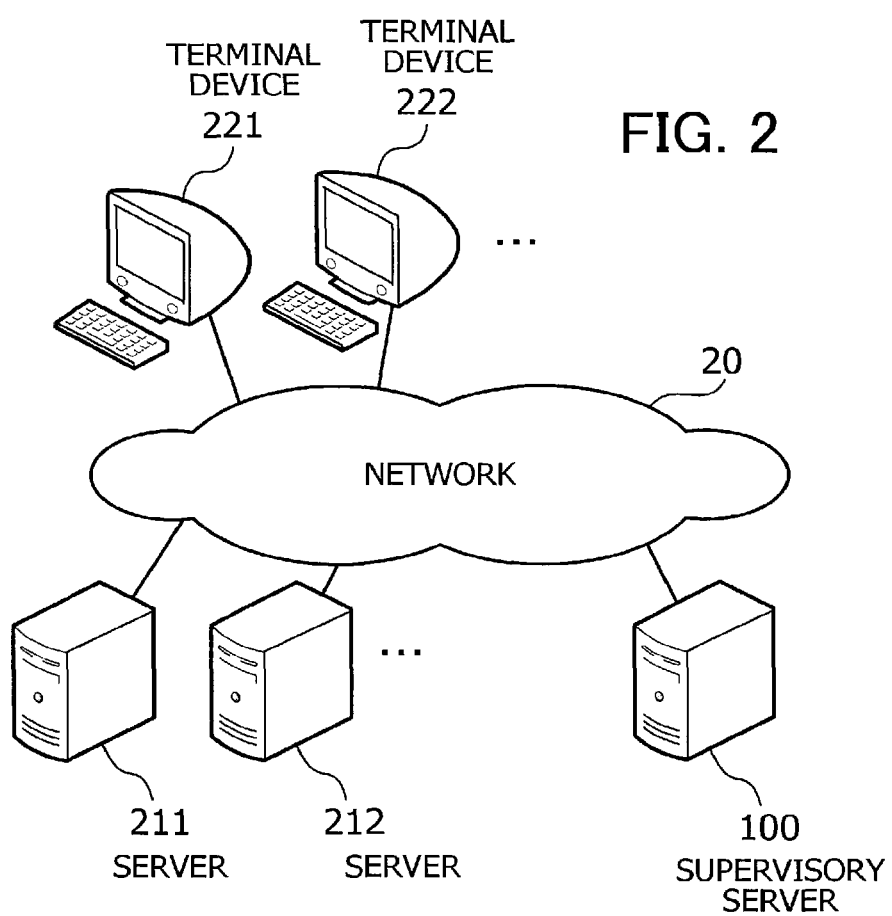
FIG. 2 illustrates an example of system configuration according to a second embodiment.

FIG. 2 illustrates an example of system configuration according to the second embodiment. This system includes servers 211, 212, . . . , terminal devices 221, 222, . . . , and a supervisory server 100, which are connected to a network 20. The servers 211, 212, . . . are computers that provide processing services upon request from terminal devices. Two or more of those servers 211, 212, . . . may work together to provide a specific service. Terminal devices 221, 222, . . . are users' computers that utilize services that the above servers 211, 212, . . . provide.

The supervisory server 100 supervises communication messages transmitted over the network 20 and records them in the form of communication logs. The supervisory server 100 performs machine learning of a neural network using the communication logs, so as to optimize the neural network for use in detecting suspicious communication. With the optimized neural network, the supervisory server 100 detects time periods in which suspicious communication took place.

Figure 3:
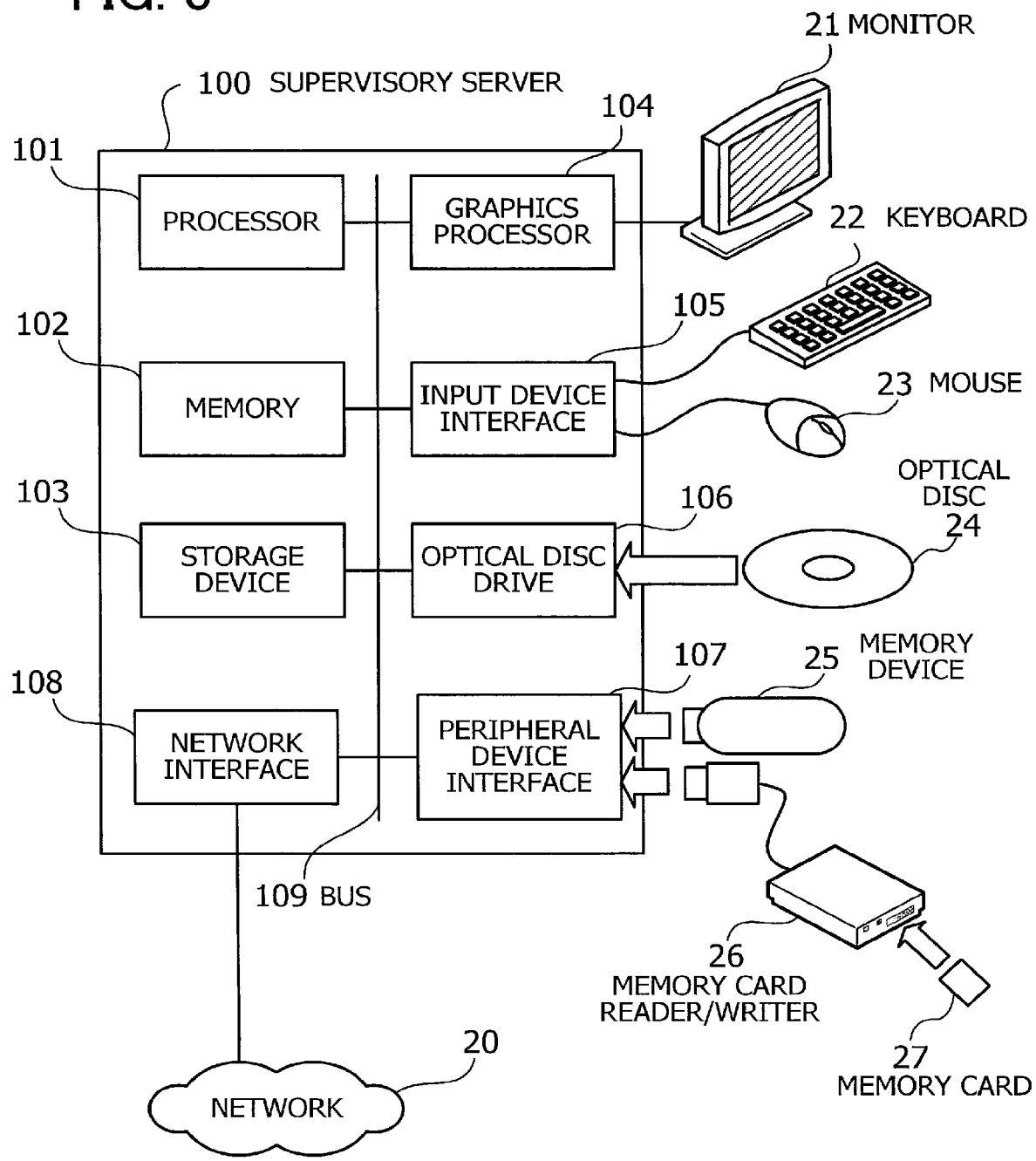
FIG. 3 illustrates an example of hardware configuration of a supervisory server used in the second embodiment.

FIG. 3 illustrates an example of hardware configuration of a supervisory server used in the second embodiment. The illustrated supervisory server 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the supervisory server 100. Specifically, the memory 102 is used to temporarily store at least some of the operating system (OS) programs and application programs that the processor 101 executes, as well as other various data objects that it manipulates at runtime. For example, the memory 102 may be implemented by using a random access memory (RAM) or other volatile semiconductor memory devices.

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the supervisory server 100 to store program and data files of the operating system and applications. For example, the storage device 103 may be implemented by using hard disk drives (HDD) or solid state drives (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices, such as a keyboard 22 and a mouse 23 and supplies signals from those devices to the processor 101. The mouse 23 is a pointing device, which may be replaced with other kind of pointing devices, such as a touchscreen, tablet, touchpad, and trackball.

The optical disc drive 106 reads out data encoded on an optical disc 24, by using laser light. The optical disc 24 is a portable data storage medium, the data recorded on which is readable as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the supervisory server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform may be used to implement the processing functions of the second embodiment. The same hardware configuration of the supervisory server 100 of FIG. 3 may similarly be applied to the foregoing machine learning apparatus 10 of the first embodiment.

The supervisory server 100 provides various processing functions of the second embodiment by, for example, executing computer programs stored in a computer-readable storage medium. A variety of storage media are available for recording programs to be executed by the supervisory server 100. For example, the supervisory server 100 may store program files in its own storage device 103. The processor 101 reads out at least part of those programs in the storage device 103, loads them into the memory 102, and executes the loaded programs. Other possible storage locations for the server programs include an optical disc 24, memory device 25, memory card 27, and other portable storage medium. The programs stored in such a portable storage medium are installed in the storage device 103 under the control of the processor 101, so that they are ready to execute upon request. It may also be possible for the processor 101 to execute program codes read out of a portable storage medium, without installing them in its local storage devices.

The following part of the description explains what functions the supervisory server provides.

Figure 4:
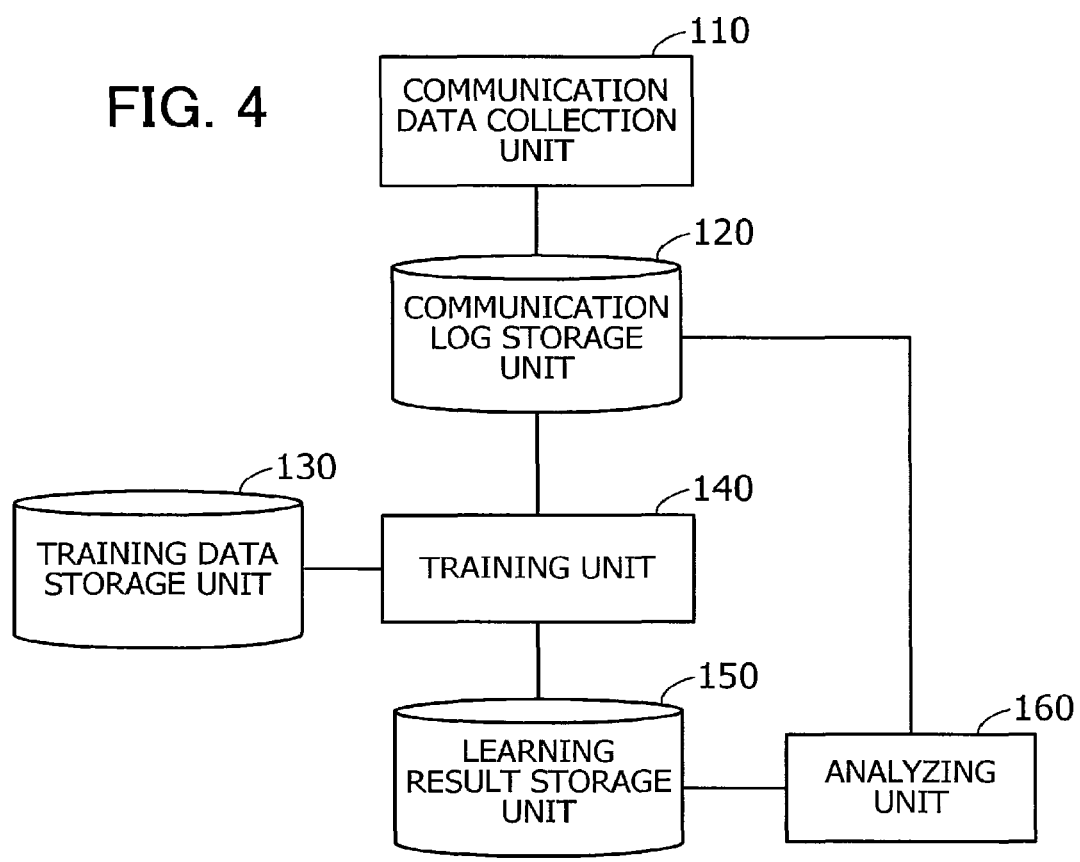
FIG. 4 is a block diagram illustrating an example of functions provided in the supervisory server.

FIG. 4 is a block diagram illustrating an example of functions provided in the supervisory server. Specifically, the illustrated supervisory server 100 includes a communication data collection unit 110, a communication log storage unit 120, a training data storage unit 130, a training unit 140, a learning result storage unit 150, and an analyzing unit 160.

The communication data collection unit 110 collects communication data (e.g., packets) transmitted and received over the network 20. For example, the communication data collection unit 110 collects packets passing through a switch placed in the network 20. More specifically, a copy of these packets is taken out of a mirroring port of the switch. It may also be possible for the communication data collection unit 110 to request servers 211, 212, to send their respective communication logs. The communication data collection unit 110 stores the collected communication data in a communication log storage unit 120.

The communication log storage unit 120 stores therein the logs of communication data that the communication data collection unit 110 has collected. The stored data is called "communication logs."

The training data storage unit 130 stores therein a set of records indicating the presence of suspicious communication during each unit time window (e.g., ten minutes) in a specific past period. The indication of suspicious communication or lack thereof may be referred to as "training flags."

The training unit 140 trains a neural network with the characteristics of suspicious communication on the basis of communication logs in the communication log storage unit 120 and training flags in the training data storage unit 130. The resulting neural network thus knows what kind of communication is considered suspicious. For example, the training unit 140 generates a reference pattern for use in rearrangement of input data records for a neural network. The training unit 140 also determines weights that the neural units use to evaluate their respective input values. When the training is finished, the training unit 140 stores the learning results into a learning result storage unit 150, including the neural network, reference pattern, and weights.

The learning result storage unit 150 is a place where the training unit 140 is to store its learning result.

The analyzing unit 160 retrieves from the communication log storage unit 120 a new communication log collected in a unit time window, and analyzes it with the learning result stored in the learning result storage unit 150. The analyzing unit 160 determines whether any suspicious communication took place in that unit time window.

It is noted that the solid lines interconnecting functional blocks in FIG. 4 represent some of their communication paths. The person skilled in the art would appreciate that there may be other communication paths in actual implementations. Each functional blocks seen in FIG. 4 may be implemented as a program module, so that a computer executes the program module to provide its encoded functions.

The following description now provides specifics of what is stored in the communication log storage unit 120.

Figure 5:
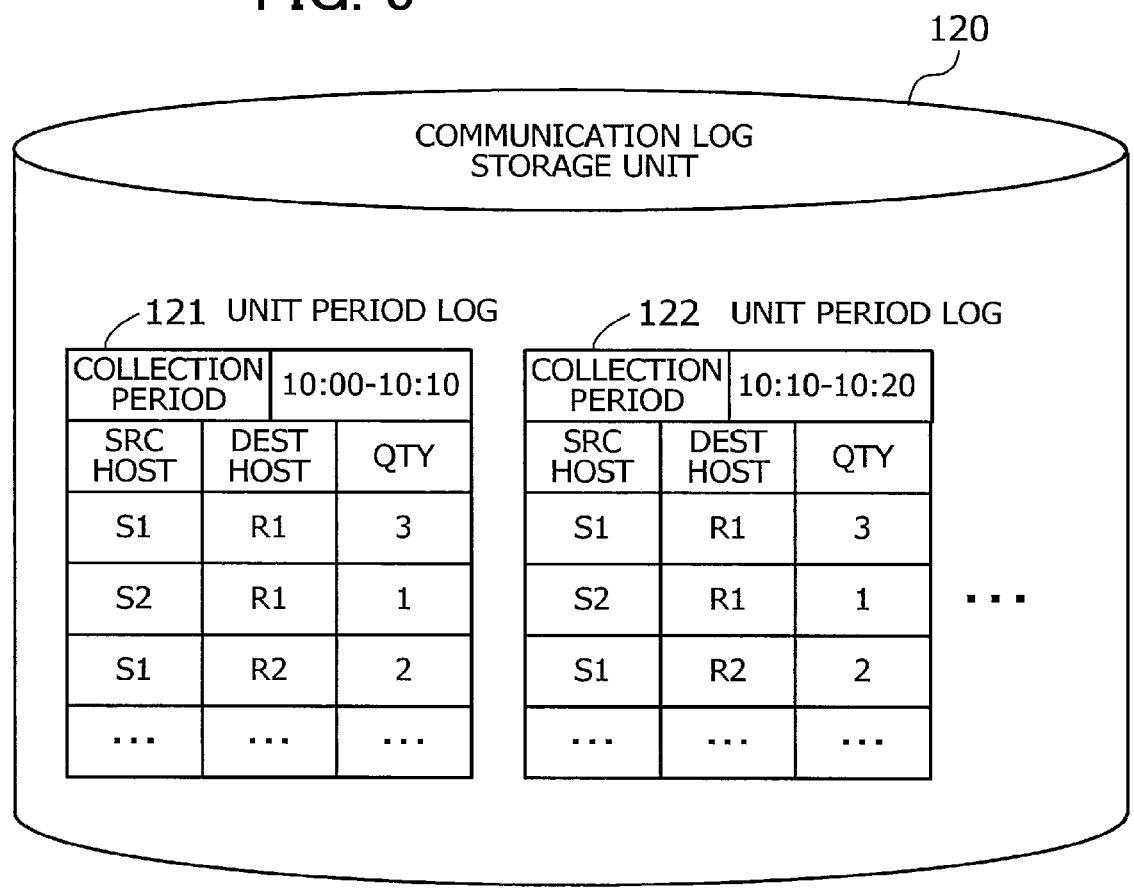
FIG. 5 illustrates an example of a communication log storage unit.

FIG. 5 illustrates an example of a communication log storage unit. The illustrated communication log storage unit 120 stores therein a plurality of unit period logs 121, 122, ..., each containing information about the collection period of a communication log, followed by the communication data collected within the period.

Each record of the unit period logs 121, 122, ... is formed from data fields named "Source Host" (SRC HOST), "Destination Host" (DEST HOST), and "Quantity" (QTY). The source host field contains an identifier that indicates the source host device of a packet, and the destination host field contains an identifier that indicates the destination host device of that packet. The quantity field indicates the number of communications that occurred between the same source host and the same destination host in the unit period log of interest. The unit period logs 121, 122, ... may further have an additional data field to indicate which port was used for communication (e.g., destination TCP/UDP port number).

The next description provides specifics of what is stored in the training data storage unit 130.

Figure 6:
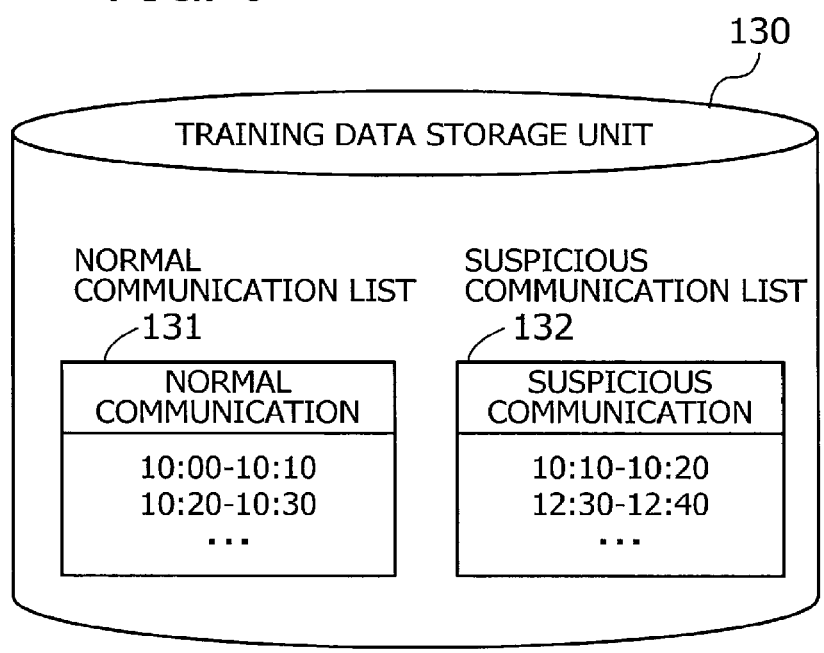
FIG. 6 illustrates an example of a training data storage unit.

FIG. 6 illustrates an example of a training data storage unit. The illustrated training data storage unit 130 stores therein a normal communication list 131 and a suspicious communication list 132. The normal communication list 131 enumerates unit periods in which normal communication took place. The suspicious communication list 132 enumerates unit periods in which suspicious communication took place. The unit periods may be defined by, for example, an administrator of the system.

As part of a machine learning process, training labels are determined for communication logs collected in different unit periods. Each training label indicates a desired (correct) output value that the neural network is expected to output when a communication log is given as its input dataset. The values of training labels depend on whether their corresponding unit periods are registered in the normal communication list 131 or in the suspicious communication list 132. For example, the training unit 140 assigns a training label of "1.0" to a communication log of a specific unit period registered in the normal communication list 131. The training unit 140 assigns a training label of "0.0" to a communication log of a specific unit period registered in the suspicious communication list 132.

The next description provides specifics of what is stored in the learning result storage unit 150.

Figure 7:
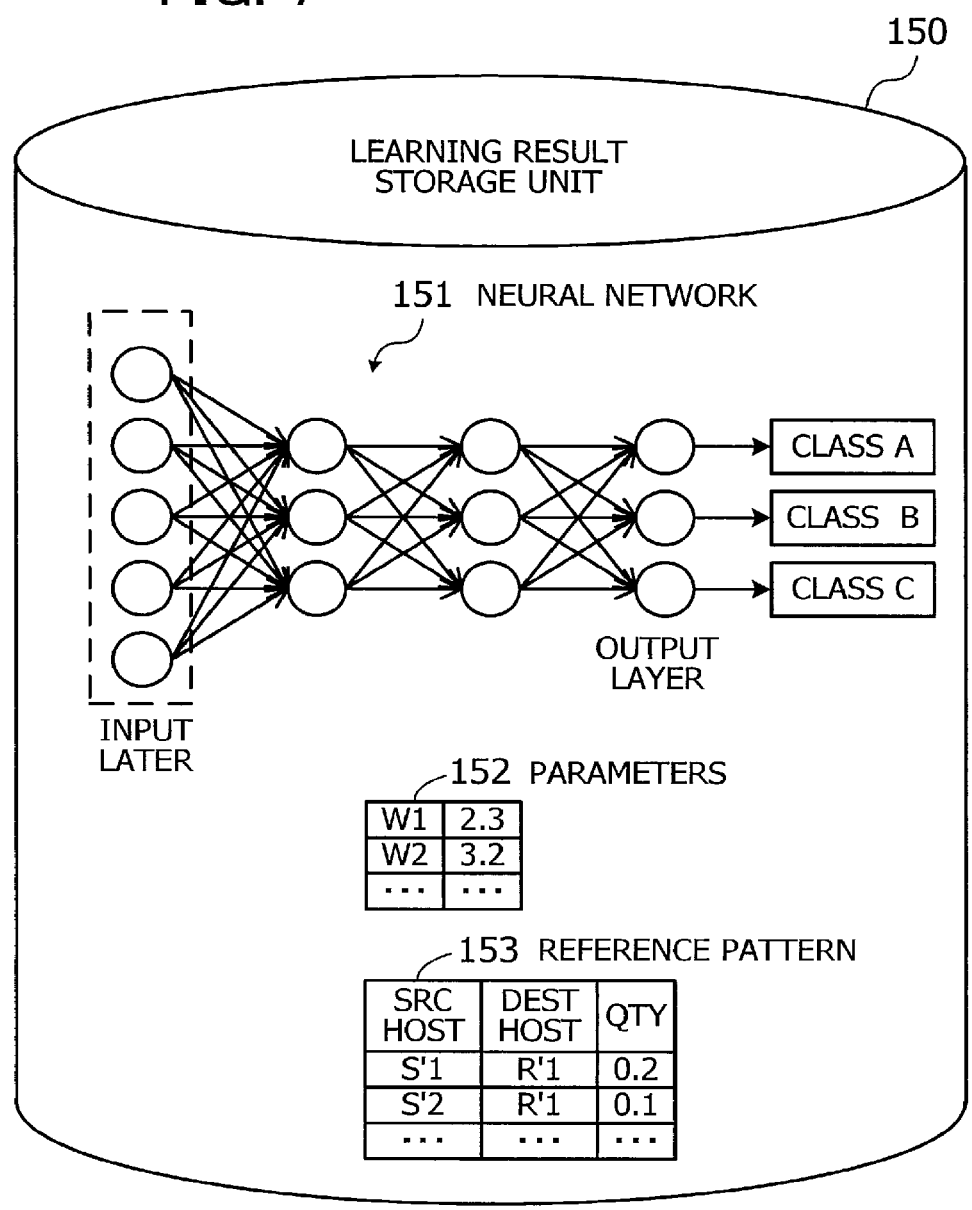
FIG. 7 illustrates an example of a learning result storage unit.

FIG. 7 illustrates an example of a learning result storage unit. The illustrated learning result storage unit 150 stores therein a neural network 151, parameters 152, and a reference pattern 153. These things are an example of the result of a machine learning process. The neural network 151 is a network of neural units (i.e., elements representing artificial neurons) with a layered structure, from input layer to output layer. FIG. 7 expresses neural units in the form of circles.

The arrows connecting neural units represent the flow of signals. Each neural unit executes predetermined processing operations on its input signals and accordingly determines an output signal to neural units in the next layer. The neural units in the output layer generate their respective output signals. Each of these output signals will indicate a specific classification of an input dataset when it is entered to the neural network 151. For example, the output signals indicate whether the entered communication log includes any sign of suspicious communication.

The parameters 152 include weight values, each representing the strength of an influence that one neural unit exerts on another neural unit. The weight values are respectively assigned to the arrows interconnecting neural units in the neural network 151.

The reference pattern 153 is a dataset used for rearranging records in a unit period log. Constituent records of a unit period log are rearranged when they are subjected to the neural network 151, such that the rearranged records will be more similar to the reference pattern 153. For example, the reference pattern 153 is formed from records each including three data fields named: "Source Host" (SRC HOST), "Destination Host" (DEST HOST), and "Quantity" (QTY). The source host field and destination host fields contain identifiers used for the purpose of analysis using the neural network 151. Specifically, the identifier in each source host field indicates a specific host device that serves as a source entity in packet communication, and the identifier in each destination host field indicates a specific host device that serves as a destination entity in packet communication. The quantity field indicates the probability of occurrence of communication events between a specific combination of source and destination hosts during a unit period.

The next part of the description explains how data is classified using the neural network 151. Note that the second embodiment employs different processing approaches according to whether measures against overtraining are implemented. Measures against overtraining are implemented, for example, when the neural network 151 is susceptible to overtraining and then the measures to be described later are applicable. The following first describes a processing approach in which no measures against overtraining are implemented. Then, a processing approach with implementation of measures to avoid overtraining is described with a focus on differences from when no such measures are in place.

<Data Classification Processing with No Implementation of Measures against Overtraining>

Figure 8:
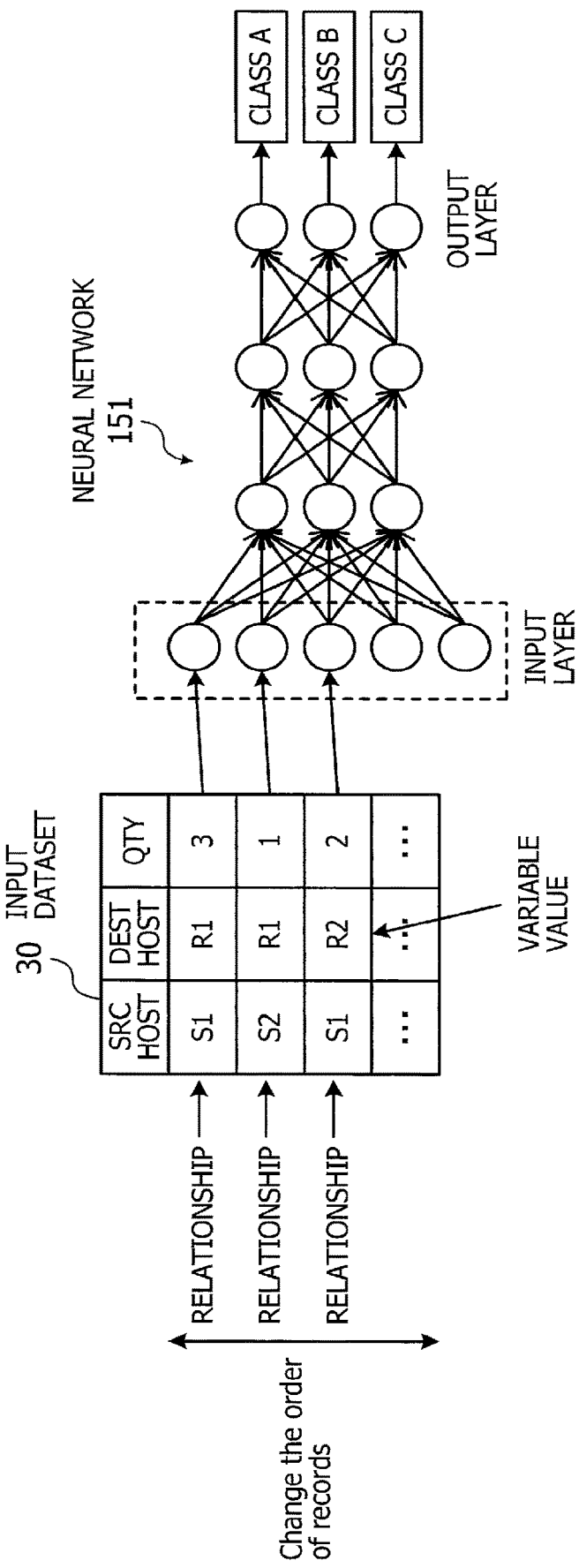
FIG. 8 illustrates a data classification method in which no measures to avoid overtraining a neural network are implemented.

FIG. 8 illustrates a data classification method in which no measures to avoid overtraining a neural network are implemented. For example, it is assumed that one unit period log is entered as an input dataset 30 to the analyzing unit 160. The analyzing unit 160 is to classify this input dataset 30 by using the neural network 151.

Individual records in the input dataset 30 are each assigned to one neural unit in the input layer of the neural network 151. The quantity-field value of each assigned record is entered to the corresponding neural unit as its input value. These input values may be normalized at the time of their entry to the input layer.

The example seen in FIG. 8 classifies a given input dataset 30 into three classes, depending on the relationships between objects (e.g., the combinations of source host and destination host) in the input dataset 30. However, it is often unknown which neural unit is an appropriate place to enter which input record. Suppose, for example, that a certain suspicious communication event takes place between process Pa in one server and process Pb in another server. The detection conditions for suspicious communication hold when server A executes process Pa and server B executes process Pb, as well as when server B executes process Pa and server A executes process Pb. As this example suggests, suspicious communication may be detected with various combination patterns of hosts.

In view of the above, the records of the input dataset 30 are rearranged before they are entered to the neural network 151, so as to obtain a correct answer about the presence of suspicious communication activities. For example, some part of relationships make a particularly considerable contribution to classification results, and such partial relationships appear regardless of the entire structure of relationships between variables. In this case, a neural network may be unable to classify the input datasets with accuracy if the noted relationships are assigned to inappropriate neural units in the input layer.

The conventional methods for rearrangement of relationship-indicating records, however, do not care about the accuracy of classification. It is therefore highly likely to overlook a better way of arrangement that could achieve more accurate classification of input datasets. One simple alternative strategy may be to generate every possible pattern of ordered input data records and try each such pattern with the neural network 151. But this alternative would only end up with too much computational load. Accordingly, the second embodiment has a training unit 140 configured to generate an optimized reference pattern 153 that enables rearrangement of records for accurate classification without increasing computational loads.

Figure 9:
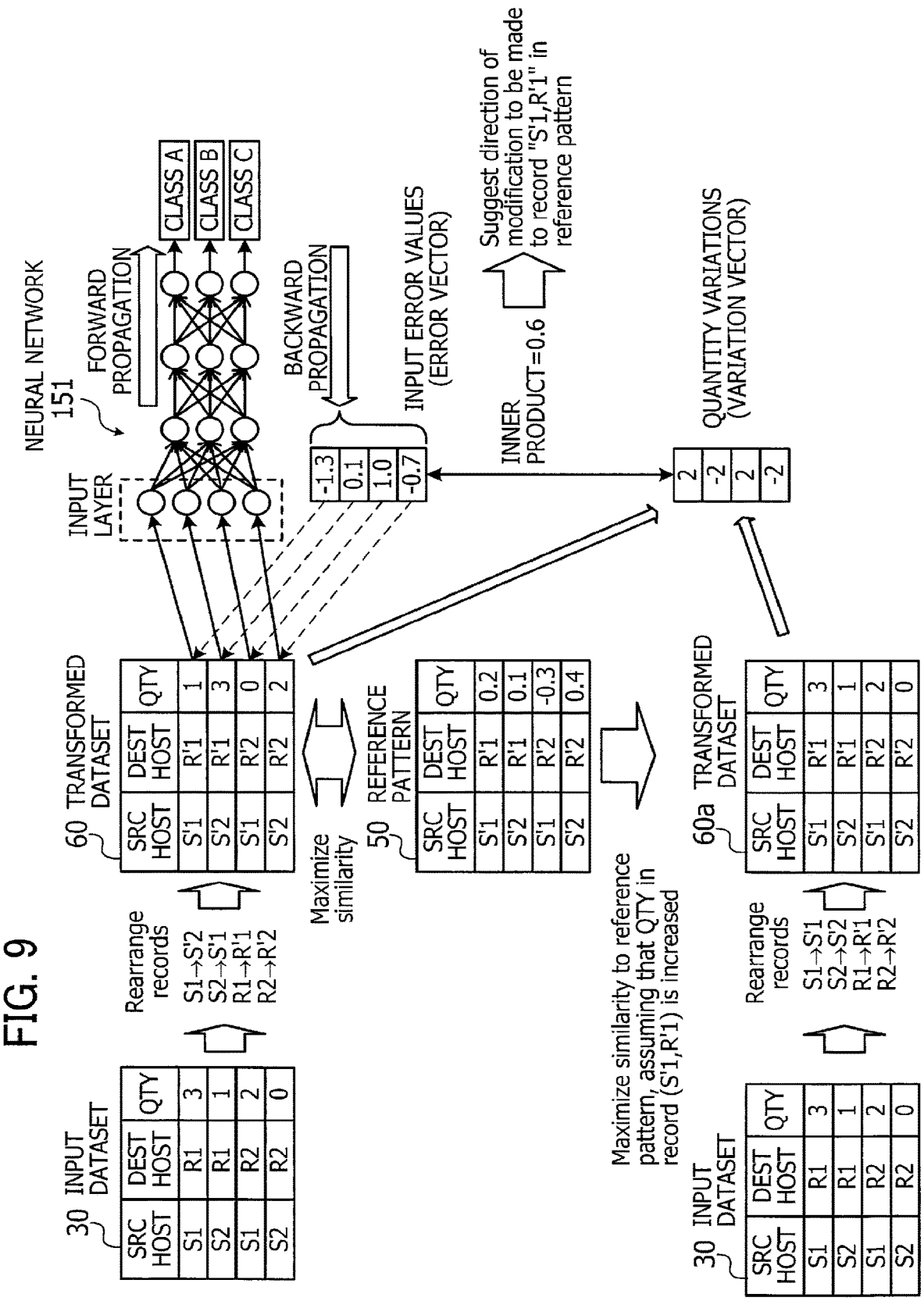
FIG. 9 presents an overview of how to optimize a reference pattern.

FIG. 9 presents an overview of how to optimize a reference pattern. The training unit 140 first gives initial values for a reference pattern 50 under development. Suppose, for example, the case of two source hosts and two destination hosts. The training unit 140 in this case generates two source host identifiers "S'1" and "S'2" and two destination host identifiers "R'1" and "R'2." The training unit 140 further combines a source host identifier and a destination host identifier in every possible way and gives an initial value of quantity to each combination. These initial quantity values may be, for example, random values. The training unit 140 now constructs a reference pattern 50 including multiple records each formed from a source host identifier, a destination host identifier, and an initial quantity value.

Subsequently the training unit 140 obtains a communication log of a unit period as an input dataset 30, out of the normal communication list 131 or suspicious communication list 132 in the training data storage unit 130. The training unit 140 then rearranges records of the input dataset 30, while remapping their source host identifiers and destination host identifiers into the above-noted identifiers for use in the reference pattern 50, thus yielding a transformed dataset 60. This transformed dataset 60 has been generated so as to provide a maximum similarity to the reference pattern 50, where the similarity is expressed as an inner product of vectors each representing quantity values of records. Note that source host identifiers in the input dataset 30 are associated one-to-one with source host identifiers in the reference pattern 50.

In the above process of generating a transformed dataset 60, the training unit 140 generates every possible vector by rearranging quantity values in the input dataset 30 and assigning the resulting sequence of quantity values as vector elements. These vectors are referred to as "input vectors." The training unit 140 also generates a reference vector from the reference pattern 50 by extracting its quantity values in the order of records in the reference pattern 50. The training unit 140 then calculates an inner product of each input vector and the reference vector and determines which input vector exhibits the largest inner product. The training unit 140 transforms source and destination host identifiers in the input dataset 30 to those in the reference pattern 50 such that the above-determined input vector will be obtained.

Referring to the example of FIG. 9, the training unit 140 finds input vector (1, 3, 0, 2) as providing the largest inner product with reference vector (0.2, 0.1, −0.3, 0.4). Accordingly, relationship "S1, R1" of the first record with a quantity value of "3" in the input dataset 30 is transformed to "S'2, R'1" in the transformed dataset 60 such that the record will take the second position in the transformed dataset 60. Relationship "S2, R1" of the second record with a quantity value of "1" in the input dataset 30 is transformed to "S'1, R'1" in the transformed dataset 60 such that the record will take the first position in the transformed dataset 60. Relationship "S1, R2" of the third record with a quantity value of "2" in the input dataset 30 is transformed to "S'2, R'2" in the transformed dataset 60 such that the record will take the fourth position in the transformed dataset 60. Relationship "S2, R2" of the fourth record with a quantity value of "0" in the input dataset 30 is transformed to "S'1, R'2" in the transformed dataset 60 such that the record will take the third position in the transformed dataset 60. As this example illustrates, the order of quantity values is determined in the first place, which is followed by transformation of source and destination host identifiers.

As can be seen from the above description, the second embodiment determines the order of records in an input dataset 30 on the basis of a reference pattern 50. In addition, the training unit 140 defines an optimal standard for rearranging records of the input dataset 30 by optimizing the above reference pattern 50 using backward propagation in the neural network 151. Details of this optimization process will now be described below.

Upon generation of a transformed dataset 60, the training unit 140 enters the quantity values in the transformed dataset 60 to their corresponding neural units in the input layer of the neural network 151. The training unit 140 calculates signals that propagate forward over the neural network 151. The training unit 140 compares the resulting output values in the output layer with correct values given in the training data storage unit 130. The difference between the two sets of values indicates an error in the neural network 151. The training unit 140 then performs backward propagation of the error. Specifically, the training unit 140 modifies connection weights in the neural network 151 so as to reduce the error. The training unit 140 also applies backward propagation to the input layer, thereby calculating an error in neural input values. This error in the input layer is represented in the form of an error vector. In the example of FIG. 9, an error vector (−1.3, 0.1, 1.0, −0.7) is calculated.

The training unit 140 further calculates variations of the quantity values in the transformed dataset 60 with respect to a modification made to the reference pattern 50. For example, the training unit 140 assumes a modified version of the reference pattern 50 in which the quantity value of "S'1, R'1" is increased by one. The training unit 140 then generates a transformed dataset 60a that exhibits the closest similarity to the modified reference pattern. This transformed dataset 60a is generated in the same way as the foregoing transformed dataset 60, except that a different reference pattern is used. For example, the training unit 140 generates a temporary reference pattern by giving a modified quantity value of "1.2" (0.2+1) to the topmost record "S'1, R'1" in the reference pattern 50. The training unit 140 then rearranges records of the input dataset 30 to maximize its similarity to the temporary reference pattern, thus yielding a transformed dataset 60a. As the name implies, the temporary reference pattern is intended only for temporary use to evaluate how a modification in one quantity value in the reference pattern 50 would influence the transformed dataset 60. A change made to the reference pattern 50 in its quantity value causes the training unit 140 to generate a new transformed dataset 60$a$ different from the previous transformed dataset 60.

The training unit 140 now calculates variations in the quantity field of the newly generated transformed dataset 60$a$ with respect to the previous transformed dataset 60. For example, the training unit 140 subtracts the quantity value of each record in the previous transformed dataset 60 from the quantity value of the counterpart record in the new transformed dataset 60$a$, thus obtaining a variation vector (2, −2, 2, −2) representing quantity variations.

The training unit 140 then calculates an inner product of the foregoing error vector and the variation vector calculated above. The calculated inner product suggests the direction and magnitude of a modification to be made to the quantity field of record "S'1, R'1" in the reference pattern 50. As noted above, the quantity value of record "S'1, R'1" in the reference pattern 50 has temporarily been increased by one. If this modification causes an increase of classification error, the inner product will have a positive value. Accordingly, the training unit 140 multiplies the inner product by negative real value. The resulting product indicates the direction of modifications to be made to (i.e., whether to increase or decrease) the quantity field of record "S'1, R'1" in the reference pattern 50. For example, the training unit 140 adds this product to the current quantity value of record "S'1, R'1," thus making the noted modification in the quantity. In the case where two or more input datasets, the training unit 140 may modify the quantity values of their respective records "S'1, R'1" according to an average of inner products calculated for those input datasets.

The reference pattern 50 has other records than the record "S'1, R'1" discussed above and their respective quantity values. The training unit 140 generates more transformed datasets, assuming that each of those quantity values is increased by one, and accordingly modifies the reference pattern 50 in the way discussed above.

As can be seen from the above description, the training unit 140 is designed to investigate how the reference pattern deviates from what it ought to be, such that the classification error would increase, and determines the amount of such deviation. This is achieved by calculating a product of an error in the input layer (i.e., indicating the direction of quantity variations in a transformed dataset that increase classification error) and quantity variations observed in a transformed dataset as a result of a change made to the reference pattern.

The description will now provide details of how the training unit 140 performs a machine learning process.

Figure 10:
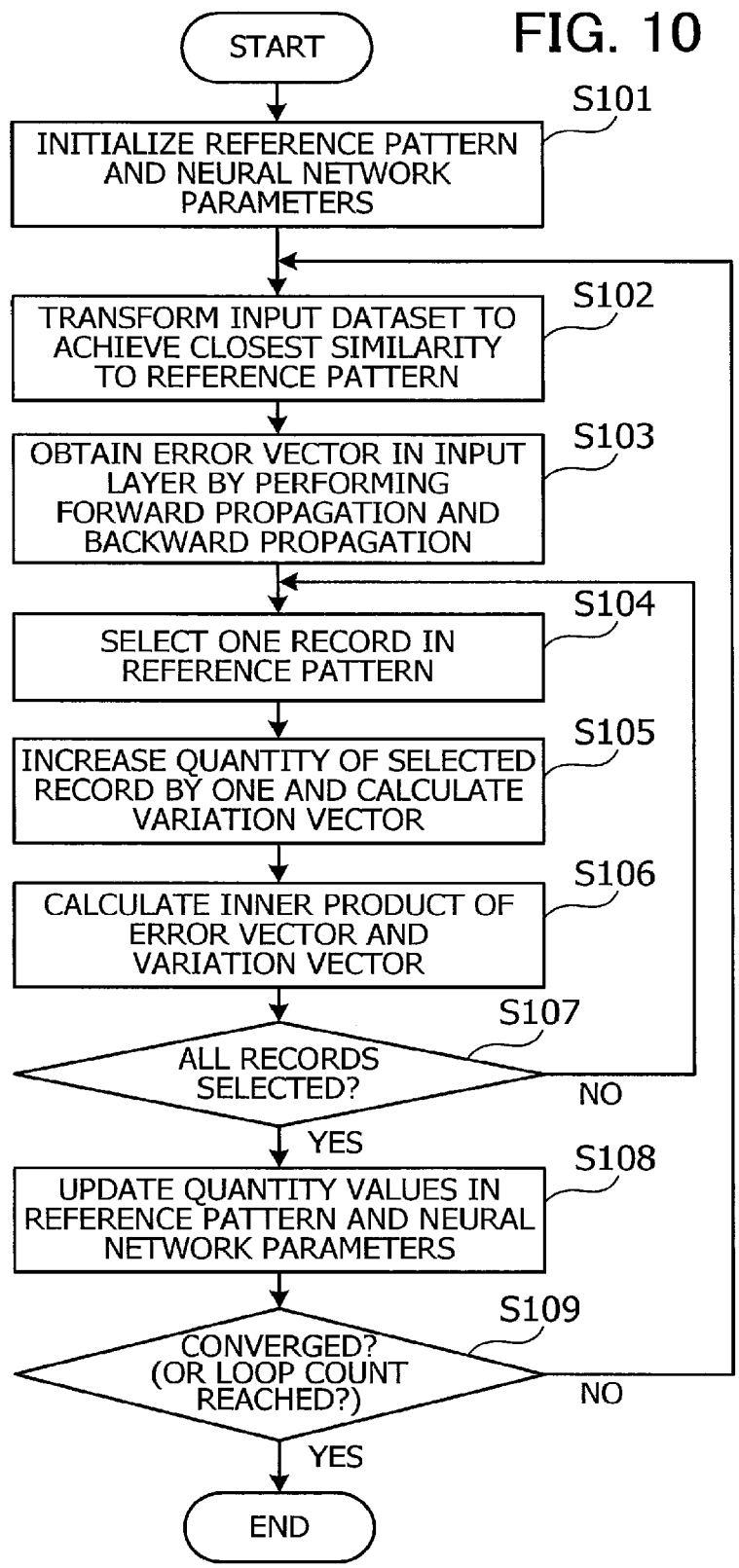
FIG. 10 is an example of a flowchart illustrating a machine learning process in which no measures against overtraining a neural network are implemented.

FIG. 10 is an example of a flowchart illustrating a machine learning process in which no measures against overtraining a neural network are implemented. Each operation in FIG. 10 is described below in the order of step numbers.

(Step S101) The training unit 140 initializes a reference pattern and parameters representing weights of inputs to neural units constituting a neural network. For example, the training unit 140 fills out the quantity field of records in the reference pattern with randomly generated values. The training unit 140 also assigns randomly generated values to the weights.

(Step S102) The training unit 140 transforms an input dataset in such a way that it will have the closest similarity to the reference pattern, thus generating a transformed dataset.

(Step S103) The training unit 140 performs forward propagation of signals over the neural network and backward propagation of output error, thus obtaining an error vector in the input layer.

(Step S104) The training unit 140 selects one pending record out of the reference pattern.

(Step S105) The training unit 140 calculates a variation vector representing quantity variations in a transformed dataset that is generated with an assumption that the quantity value of the selected record is increased by one.

(Step S106) The training unit 140 calculates an inner product of the error vector obtained in step S103 and the variation vector calculated in step S105. The training unit 140 interprets this inner product as a modification to be made to the selected record.

(Step S107) The training unit 140 determines whether the records in the reference pattern have all been selected. If all records are selected, the process advances to step S108. If any pending record remains, the process returns to step S104.

(Step S108) The training unit 140 updates the quantity values of the reference pattern, as well as the weight parameters of the neural network. For example, the training unit 140 adds the modification values calculated in step S106 to their corresponding quantity values in the reference pattern. The training unit 140 also updates weight parameters with their modified values obtained in the backward propagation.

(Step S109) The training unit 140 determines whether the process has reached its end condition. For example, the training unit 140 determines that an end condition is reached when quantity values in the reference pattern and weight parameters in the neural network appear to be converged, or when the loop count of steps S102 to S108 has reached a predetermined number. Convergence of quantity values in the reference pattern may be recognized if, for example, step S108 finds that no quantity values make a change exceeding a predetermined magnitude. Convergence of weight parameters may be recognized if, for example, step S108 finds that the sum of variations in the parameters does not exceed a predetermined magnitude. In other words, convergence is detected when both the reference pattern and neural network exhibit little change in step S108. The process is terminated when such end conditions are met. Otherwise, the process returns to step S102 to repeat the above processing.

The above-described procedure permits the training unit 140 to execute a machine learning process and thus determine appropriate quantity values in the reference pattern and a proper set of parameter values. Now with reference to FIGS. 11 to 17, a specific example of machine learning will be explained below. It is noted that the field names "Term S" and "Term R" are used in FIGS. 11 to 17 to respectively refer to the source host and destination host of transmitted packets.

Figure 11:
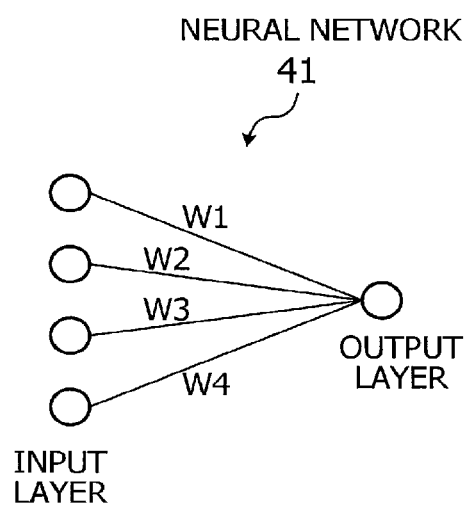
FIG. 11 illustrates an example of a neural network used in machine learning.

FIG. 11 illustrates an example of a neural network used in machine learning. For easier understanding of processes according to the second embodiment, FIG. 11 presents a two-layer neural network 41 formed from four neural units in its input layer and one neural unit in its output layer. It is assumed here that four signals that propagate between the two layers are weighted by given parameters W1, W2, W3, and W4. The training unit 140 performs machine learning with the neural network 41.

Figure 12:
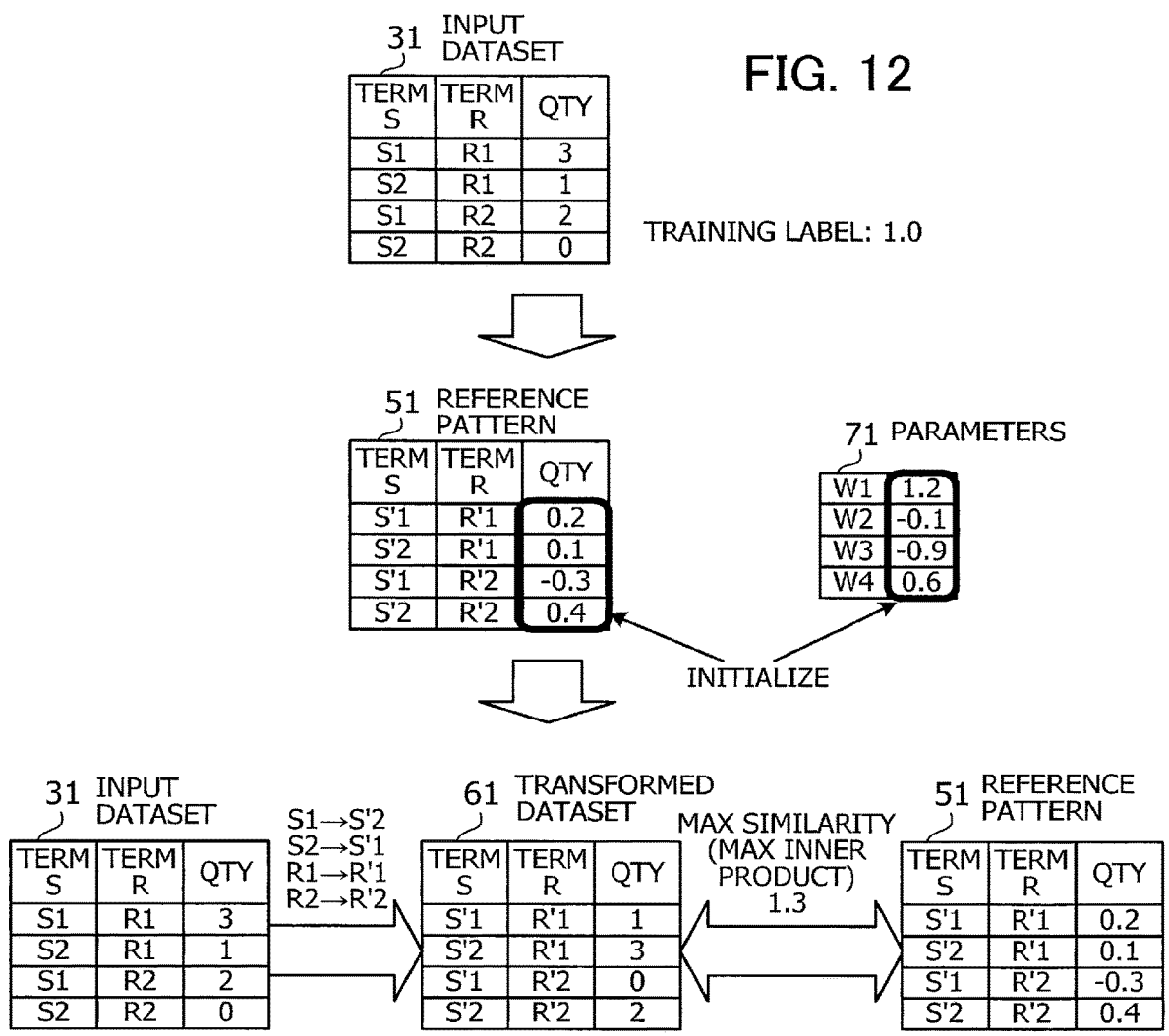
FIG. 12 is a first diagram illustrating a machine learning process by way of example.

FIG. 12 is a first diagram illustrating a machine learning process by way of example. Suppose, for example, that the training unit 140 performs machine learning on the basis of an input dataset 31 with a training label of "1.0." The training unit 140 begins with initializing quantity values in a reference pattern 51 and weight values using parameters 71.

The training unit 140 then rearranges the order of records in the input dataset 31 such that they will have a maximum similarity to the reference pattern 51, thus generating a transformed dataset 61. Referring to the example of FIG. 12, a reference vector (0.2, 0.1, −0.3, 0.4) is created from quantity values in the reference pattern 51, and an input vector (1, 3, 0, 2) is created from quantity values in the transformed dataset 61. The inner product of these two vectors has a value of 1.3.

Figure 13:
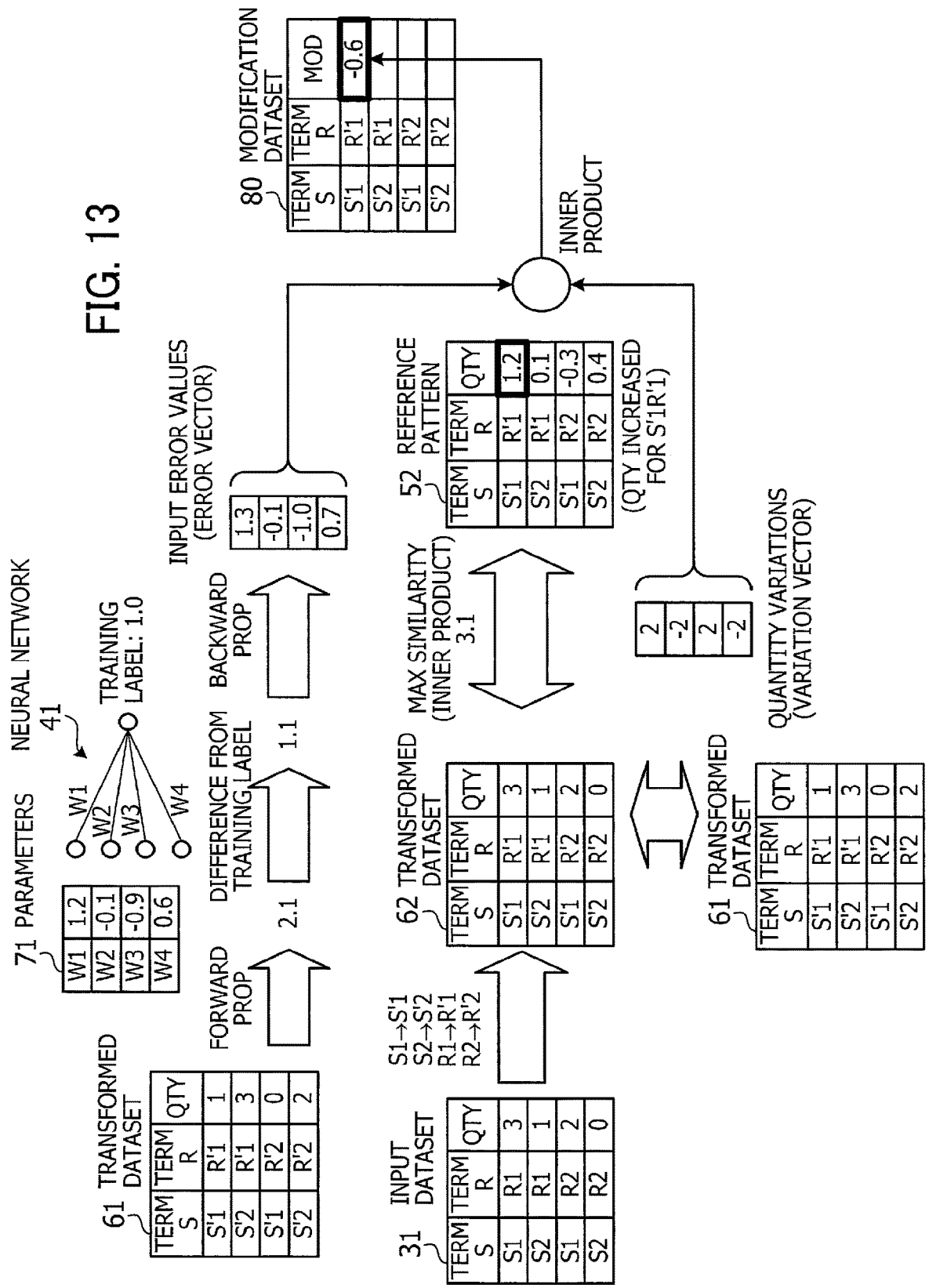
FIG. 13 is a second diagram illustrating a machine learning process by way of example.

FIG. 13 is a second diagram illustrating a machine learning process by way of example. The training unit 140 subjects the above-noted input vector to forward propagation over the neural network 41, thus calculating an output value. For example, the training unit 140 multiplies each element of the input vector by its corresponding weight value (i.e., weight value assigned to the neural unit that receives the vector element). The training unit 140 adds up the products calculated for individual vector elements and outputs the resulting sum as an output value of forward propagation. In the example of FIG. 13, the forward propagation results in an output value of 2.1 since the sum (1×1.2+3×(−0.1)+0×(−0.9)+2×0.6) amounts to 2.1. The training unit 140 now calculates a difference between the output value and training label value. For example, the training unit 140 obtains a difference value of 1.1 by subtracting the training label value 1.0 from the output value 2.1. In other words, the output value exceeds the training label value by an error of 1.1. This error is referred to as an "output error."

The training unit 140 then calculates input error values by performing backward propagation of the output error toward the input layer. For example, the training unit 140 multiplies the output error by a weight value assigned to an input-layer neural unit. The resulting product indicates an input error of the quantity value at that particular neural unit. The training unit 140 repeats the same calculation for other neural units and forms a vector from input error values of four neural units in the input layer. The training unit 140 obtains an error vector (1.3, −0.1, −1.0, 0.7) in this way. Positive elements in an error vector denote that the input values of corresponding neural units are too large. Negative elements in an error vector denote that the input values of corresponding neural units are too small.

The training unit 140 generates another reference pattern 52 by adding one to the quantity value of record "S'1, R'1" in the initial reference pattern 51 (see FIG. 12). The quantity field of record "S'1, R'1" in the reference pattern 52 now has a value of 1.2 as indicated by a bold frame in FIG. 13. The training unit 140 then rearranges records in the input dataset 31 such that they will have a maximum similarity to the noted reference pattern 52, thus generating a transformed dataset 62. The training unit 140 makes a comparison of quantity values between the original transformed dataset and the newly generated transformed dataset 62, thus calculating variations in their quantity fields. More specifically, the quantity value of each record in the transformed dataset 61 is compared with the quantity value of the corresponding record in the transformed dataset 62. The two records have the same combination of a source host identifier (term S) and a destination host identifier (term R). Take records "S'1, R'1," for example. The quantity value "1" in the original transformed dataset 61 is subtracted from the quantity value "3" in the new transformed dataset 62, thus obtaining a variation of "2" between their records "S'1, R'1." The training unit 140 calculates such quantity variations from each record pair, finally yielding a variation vector (2, −2, 2, −2).

The training unit 140 calculates an inner product of the error vector (1.3, −0.1, −1.0, 0.7) and variation vector (2, −2, 2, −2). This inner product, −0.6, suggests a modification to be made to a specific combination of source host (term S) and destination host (term R) (e.g., "S'1, R'1" in the present case). For example, the training unit 140 registers a modification value (MOD) of −0.6 as part of record "S'1, R'1" in the modification dataset 80.

The error vector suggests how much and in which direction the individual input values deviate from what they ought to be, such that the output value would have an increased error. If this error vector resembles a variation vector that is obtained by adding one to the quantity value of record "S'1, R'1," it means that the increase in the quantity value acts on the output value in the direction that expands the output error. That is, the output value will have more error if the quantity value of record "S'1, R'1" is increased, in the case where the inner product of error vector and variation vector is positive. On the other hand, the output value will have less error if the quantity value of record "S'1, R'1" is increased, in the case where the inner product of error vector and variation vector is negative.

Figure 14:
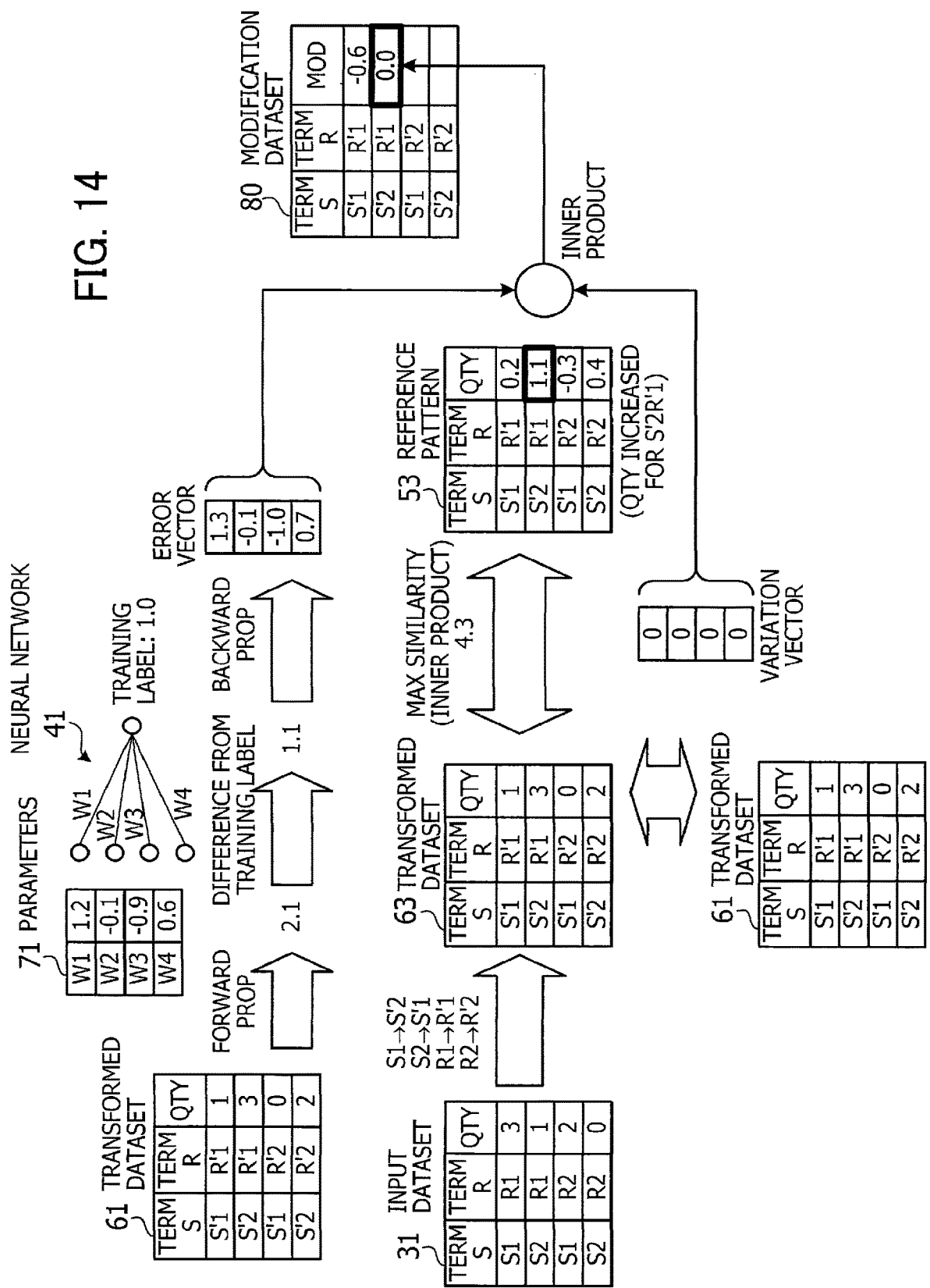
FIG. 14 is a third diagram illustrating a machine learning process by way of example.

FIG. 14 is a third diagram illustrating a machine learning process by way of example. The training unit 140 generates yet another reference pattern 53 by adding one to the quantity value of record "S'2, R'1" in the initial reference pattern 51 (see FIG. 12). The quantity field of record "S'2, R'1" in the reference pattern 53 now has a value of 1.1 as indicated by a bold frame in FIG. 14. The training unit 140 then rearranges records in the input dataset 31 such that they will have a maximum similarity to this reference pattern 53, thus generating a transformed dataset 63. The training unit 140 makes a comparison of quantity values between each record having a source host identifier (term S) and destination host identifier (term R) in the original transformed dataset 61 and its corresponding record in the newly generated transformed dataset 63, thus calculating variations in their quantity fields. The training unit 140 generates a variation vector (0, 0, 0, 0) indicating no quantity variations in each record pair. The training unit 140 calculates an inner product of the error vector (1.3, −0.1, −1.0, 0.7) and variation vector (0, 0, 0, 0), thus obtaining a value of 0.0. The training unit 140 registers this inner product in the modification dataset 80 as a modification value for record "S'2, R'1."

Figure 15:
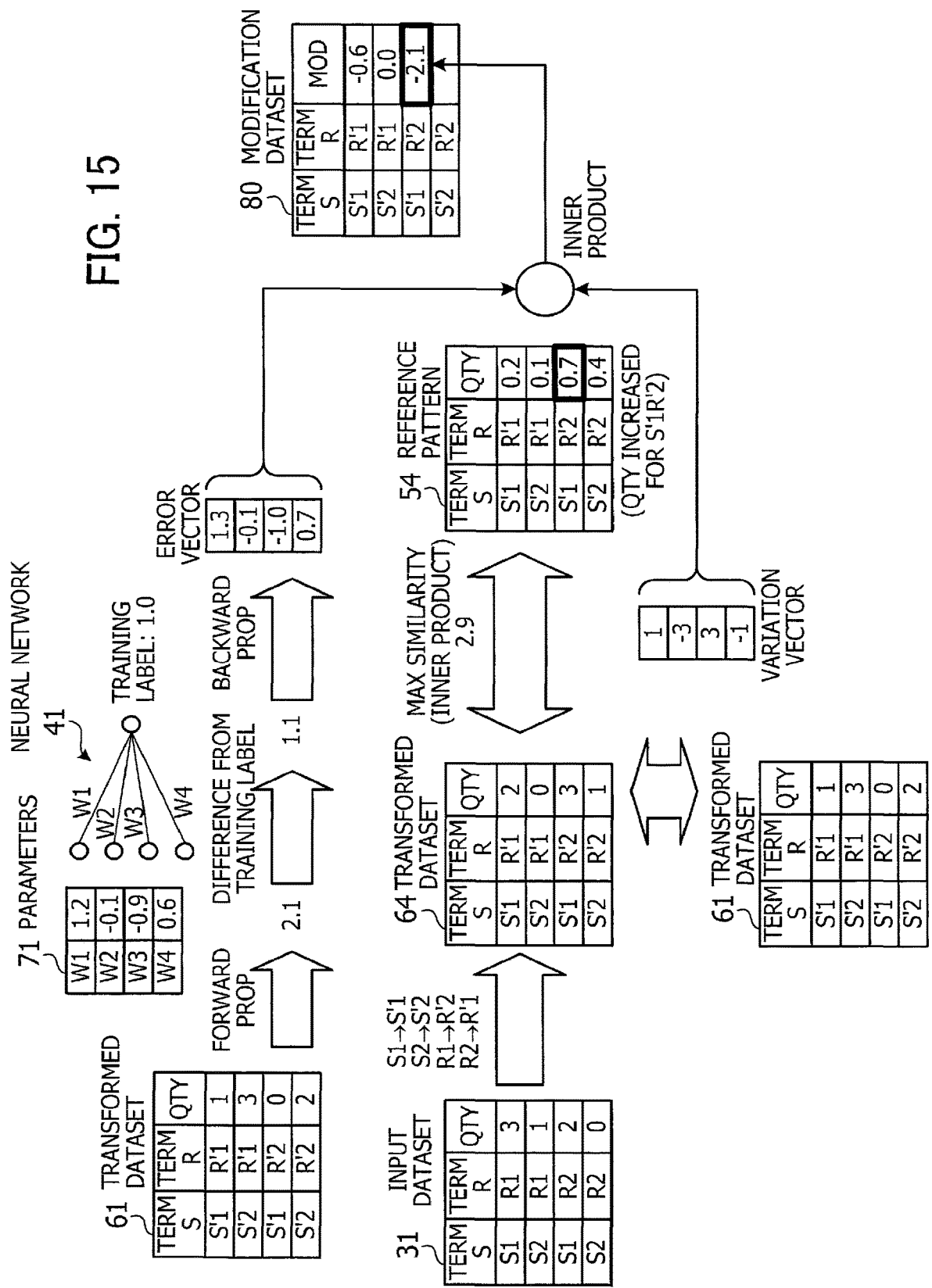
FIG. 15 is a fourth diagram illustrating a machine learning process by way of example.

FIG. 15 is a fourth diagram illustrating a machine learning process by way of example. The training unit 140 generates still another reference pattern 54 by adding one to the quantity value of record "S'1, R'2" in the initial reference pattern 51 (see FIG. 12). The quantity field of record "S'1, R'2" in the reference pattern 54 now has a value of 0.7 as indicated by a bold frame in FIG. 15. The training unit 140 then rearranges records in the input dataset 31 such that they will have a maximum similarity to this reference pattern 54, thus generating a transformed dataset 64. The training unit 140 makes a comparison of quantity values between each record having a specific source host identifier (term S) and destination host identifier (term R) in the original transformed dataset 61 and its corresponding record in the newly generated transformed dataset 64, thus calculating variations in their quantity fields. The training unit 140 generates a variation vector (1, −3, 3, −1) representing quantity variations calculated for each record pair. The training unit 140 calculates an inner product of the error vector (1.3, −0.1, −1.0, 0.7) and variation vector (1, −3, 3, −1), thus obtaining a value of −2.1. The training unit 140 registers this inner product in the modification dataset 80 as a modification value for record "S'1, R'2."

Figure 16:
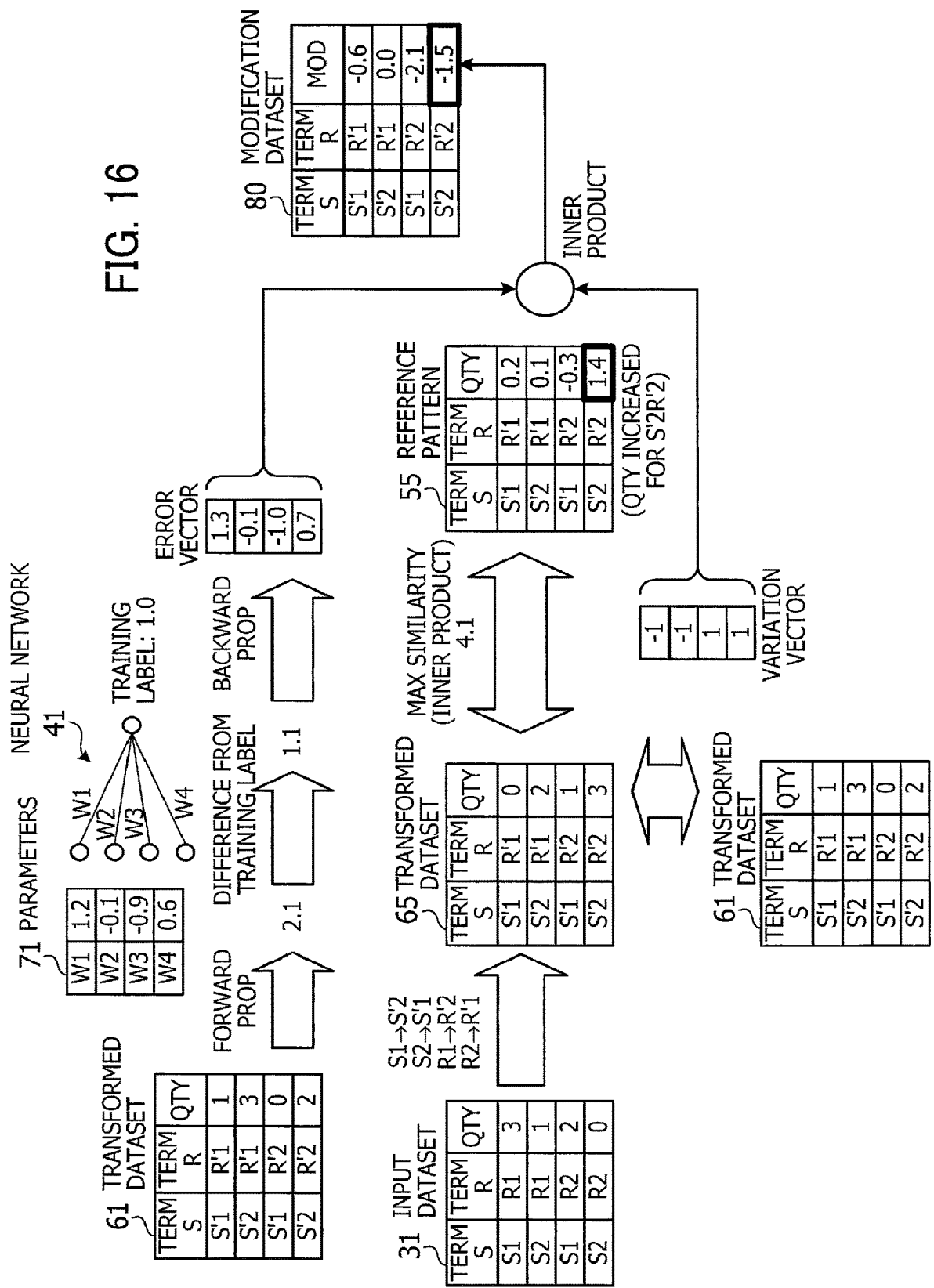
FIG. 16 is a fifth diagram illustrating a machine learning process by way of example.

FIG. 16 is a fifth diagram illustrating a machine learning process by way of example. The training unit 140 generates still another reference pattern 55 by adding one to the quantity value of record "S'2, R'2" in the initial reference pattern 51 (see FIG. 12). The quantity field of record "S'2, R'2" in the reference pattern 55 now has a value of 1.4 as indicated by a bold frame in FIG. 16. The training unit 140 then rearranges records in the input dataset 31 such that they will have a maximum similarity to this reference pattern 55, thus generating a transformed dataset 65. The training unit 140 makes a comparison of quantity values between each record having a specific source host identifier (term S) and destination host identifier (term R) in the original transformed dataset 61 and its corresponding record in the newly generated transformed dataset 65, thus calculating variations in their quantity fields. The training unit 140 generates a variation vector (−1, −1, 1, 1) representing quantity variations calculated for each record pair. The training unit 140 calculates an inner product of the error vector (1.3, −0.1, −1.0, 0.7) and variation vector (−1, −1, 1, 1), thus obtaining a value of −1.5. The training unit 140 registers this inner product in the modification dataset 80 as a modification value for record "S'2, R'2."

Figure 17:
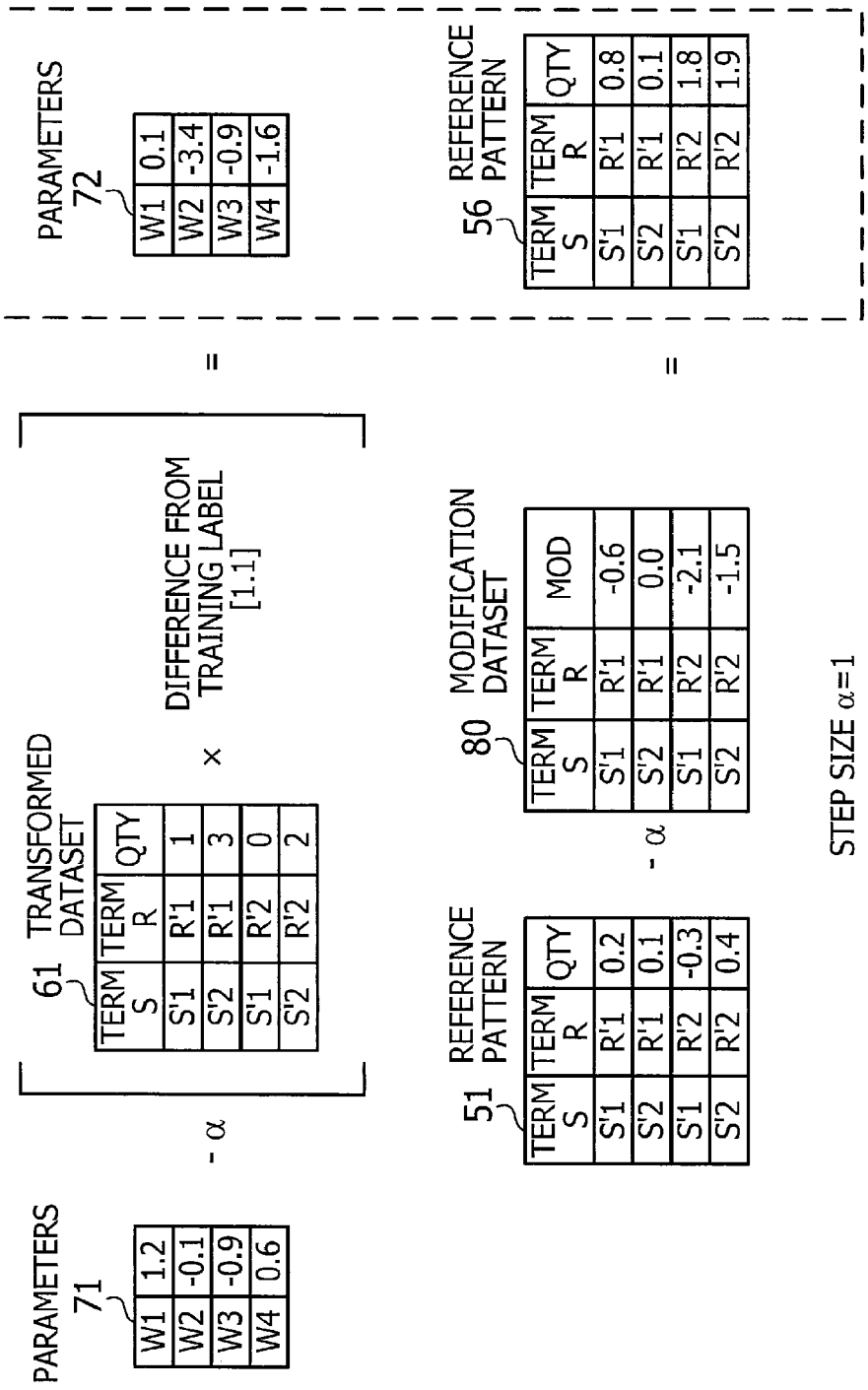
FIG. 17 is a sixth diagram illustrating a machine learning process by way of example.

FIG. 17 is a sixth diagram illustrating a machine learning process by way of example. The training unit 140 multiplies the quantity values of each record in the transformed dataset 61 by the difference, 1.1, between the forward propagation result and training label value of the neural network 41. The training unit 140 further multiplies the resulting product by a constant α. This constant α represents, for example, a step size of the neural network 41 and has a value of one in the example discussed in FIGS. 11 to 17. The training unit 140 then subtracts the result of the above calculation (i.e., the product of quantity values in the transformed dataset 61, difference 1.1 from training label, and constant α) from respective parameters 71.

For example, the training unit 140 multiples an input quantity value of 1 for the first neural unit in the input layer by a difference value of 1.1 and then by α=1, thus obtaining a product of 1.1. The training unit 140 then subtracts this product from the corresponding weight W1=1.2, thus obtaining a new weight value W1=0.1. The same calculation is performed with respect to other input-layer neural units, and their corresponding weight values are updated accordingly. Finally, a new set of parameters 72 is produced.

In addition to the above, the training unit 140 subtracts variation values in the modification dataset 80, multiplied by constant α, from the corresponding quantity values in the reference pattern 51, for each combination of a source host identifier (term S) and a destination host identifier (term R). The training unit 140 generates an updated reference pattern 56, whose quantity fields are populated with results of the above subtraction. For example, the quantity field of record "S'1, R'1" is updated to 0.8 (i.e., 0.2−1×(−0.6)).

When there are two or more input datasets, the training unit 140 calculates a plurality of transformed datasets 61 for individual input datasets and averages their quantity values. Based on those average quantities, the training unit 140 updates the weight values in parameters 71. The training unit 140 also calculates the modification dataset 80 for individual input datasets and averages their modification values. Based on those average modification values, the training unit 140 updates quantity values in the reference pattern 51.

As can be seen from the above, the training unit 140 updates reference patterns using error in the output of a neural network, and the analyzing unit 160 classifies communication logs using the last updated reference pattern. For example, the analyzing unit 160 transforms communication logs having no learning flag in such a way that they may bear the closest similarity to the reference pattern. The analyzing unit 160 then enters the transformed data into the neural network and calculates output values of the neural network. In this course of calculation, the analyzing unit 160 weights individual input values for neural units according to parameters determined above by the training unit 140. With reference to output values of the neural network, the analyzing unit 160 determines, for example, whether any suspicious communication event took place during the collection period of the communication log of interest. That is, communication logs are classified into two groups, one including normal (non-suspicious) records of communication activities and the other group including suspicious records of communication activities. The proposed method thus makes it possible to determine an appropriate order of input data records, contributing to a higher accuracy of classification.

To seek an optimal order of input data records, various possible ordering patterns may be investigated. The proposed method, however, cuts down the number of such ordering patterns and thus reduces the amount of computational resources for the optimization job. Suppose, for example, that each input record describes a combination of three items (e.g., persons or objects), respectively including A, B, and C types, and that each different combination of the three items is associated with one of N numerical values. Here, the numbers A, B, C, and N are integers greater than zero. What is to be analyzed in this case for proper reference matching amounts to as many as $(A!B!C!)^N$ possible ordering patterns. As the number N of numerical values increases, the number of such ordering patterns grows exponentially, and thus it would be more and more difficult to finish the computation of machine learning within a realistic time frame. The second embodiment assumes that the symbols A', B', and C' represent the numbers of types respectively belong to three items in the reference pattern, and that the symbol E represents the number of updates made in the neural network, where A', B', C', and E are all integers greater than zero. The amount of computation in this case is proportional to A'B'C'(A+B+C)NE. This means that the computation is possible with a realistic amount of workload.

<Data Classification Processing with Implementation of Measures against Overtraining>

If overtraining is likely to occur, preventive measures are undertaken to avoid this situation. A lack of training datasets has been found to be a contributory cause of overtraining. The sufficiency of training datasets may be determined by a comparison to the number of parameters assigned to connections (also termed "edges") between neural units in the input layer and neural units (artificial neurons) in a hidden layer following the input layer. For example, if the number of parameters between the input layer and the following hidden layer is significantly larger than that of training datasets, overtraining occurs in machine learning. The number of parameters between the input layer and the hidden layer increases with a larger number of neural units in the input layer, as well as with a larger number of neurons in the hidden layer.

Figure 18:
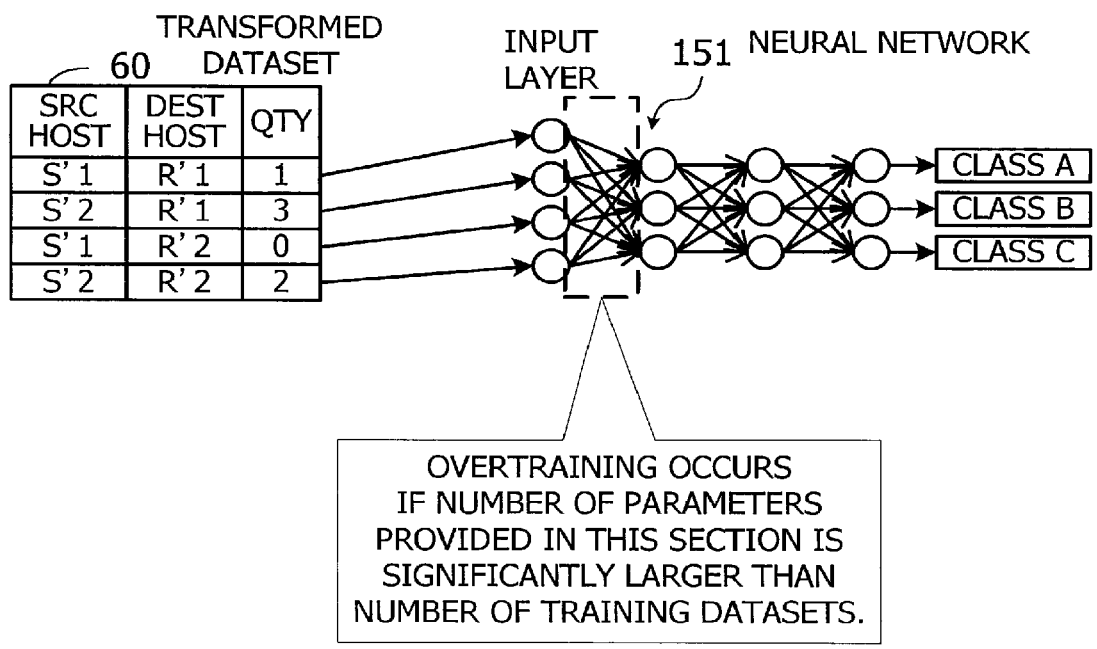
FIG. 18 illustrates a case where overtraining is caused.

FIG. 18 illustrates a case where overtraining is caused. In an illustrated neural network 151, neural units are arranged in the input layer in such a manner as to correspond one-to-one to all combination patterns of respective variable values of terms in a transformed dataset 60. The outputs from all the input-layer neural units of the neural network 151 are fed into each neuron in a layer immediately following the input layer. The arrows in the broken-line box of FIG. 18 indicate that the outputs from the input-layer neural units propagate to the right, becoming inputs to the hidden-layer neurons. Each of these inputs is multiplied by a parameter known as a weight. That is to say, as many parameters as the number of arrows in the broken-line box are assigned to corresponding inputs to be fed into the hidden layer.

Suppose, for example, that the transformed dataset 60 contains m terms associated with one another, where m is an integer greater than or equal to 1. Further supposing that the number of variable values of the individual terms is respectively denoted by $I_1, \ldots, I_m$ and a layer immediately following the input layer includes L neurons where L is an integer greater than or equal to 1, the number of parameters assigned to the connections between the input layer and the following layer is obtained by $I_1 \times \ldots \times I_m \times L$. In the case of ten source hosts, ten destination hosts, ten ports, and ten neurons in the following layer, the number of parameters is 10000 since the product (10×10×10×10) equals to 10000. When the number of parameters is 10000, if only a hundred or so input datasets are available as training data, this disproportional lack of the training data easily leads to overtraining.

Overtraining also occurs when a transformed dataset has too few degrees of freedom, where, for example, variable values of each term in the input dataset have a strong correlation with each other.

Figure 19:
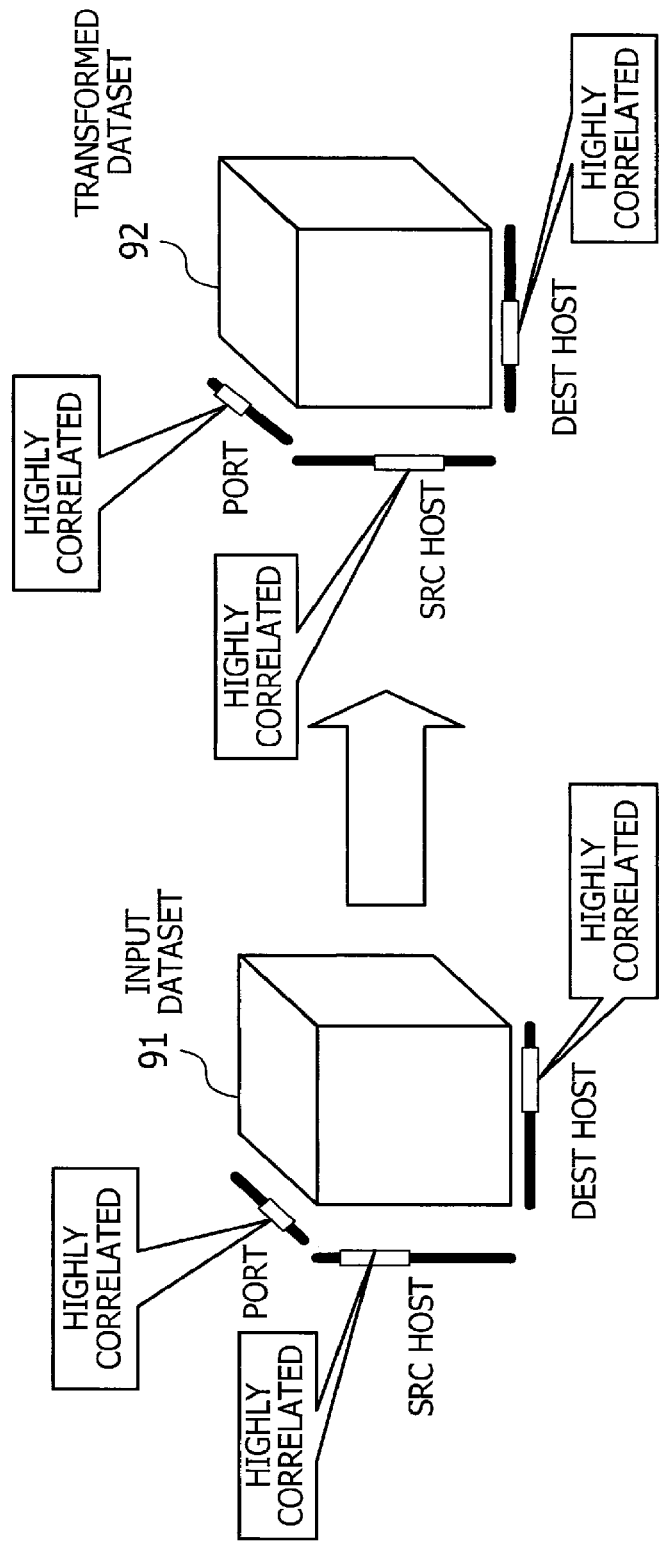
FIG. 19 illustrates a case where a transformed dataset has too few degrees of freedom by way of example.

FIG. 19 illustrates a case where a transformed dataset has too few degrees of freedom by way of example. Referring to the example of FIG. 19, an illustrated input dataset 91 includes three terms named "Source Host" (SRC HOST), "Destination Host" (DEST HOST), and "Port" (PORT). The input dataset 91 also contains a set of quantity values each associated with a specific combination pattern of respective variable values of the three terms. Supposing here that, for example, two or more source hosts frequently communicate with the same single destination host through the same single port, it is considered that there is a strong correlation among those source hosts. In this case, a group of the source hosts correlating highly with one another, the destination host, and the port is designated as a group of highly correlated variable values.

In the case where a group of highly correlated variable values is present in each of the terms in the input dataset 91 as described above, corresponding highly correlated variable values are also found in a transformed dataset 92 which is generated by transforming the input dataset 91. When variable values of each term in the transformed dataset 92 have a strong correlation with each other, the transformed dataset 92 has few degrees of freedom. The transformed dataset 92 with limited degrees of freedom facilitates creation of a reference pattern and parameter adjustments fitting all training datasets very well, and thus is likely to lead to overtraining.

One simple alternative strategy to avoid overtraining may be to reduce either the number of records in a reference pattern or the number of neurons in a layer immediately following the input layer. In the case of reducing the number of records in a reference pattern, a large number of variable values in an input dataset may be associated with a single variable value in a transformed dataset. The resultant transformed dataset, however, would fail to capture many characteristics included in the input dataset, which may lead to poor classification accuracy.

A reduction in the number of neurons in the following layer, on the other hand, makes many characteristics included in a transformed dataset unable to propagate through the neural network to reach neurons in higher layers, which may lead to poor classification accuracy.

In view of the above, the second embodiment is intended to reduce the number of parameters between the input layer and the following layer in the following manner. Each of these parameters is assigned, in relation to a neuron in the following layer, to a relationship among terms indicated by a corresponding record in a transformed dataset. It is possible to represent such a parameter by using a product of parameters each assigned, in relation to the neuron in the following layer, to one of the variable values included in the relationship. In this case, the learning process of a neural network is directed to learning values of the latter parameters to achieve a correct classification result indicated by corresponding training data.

Figure 20:
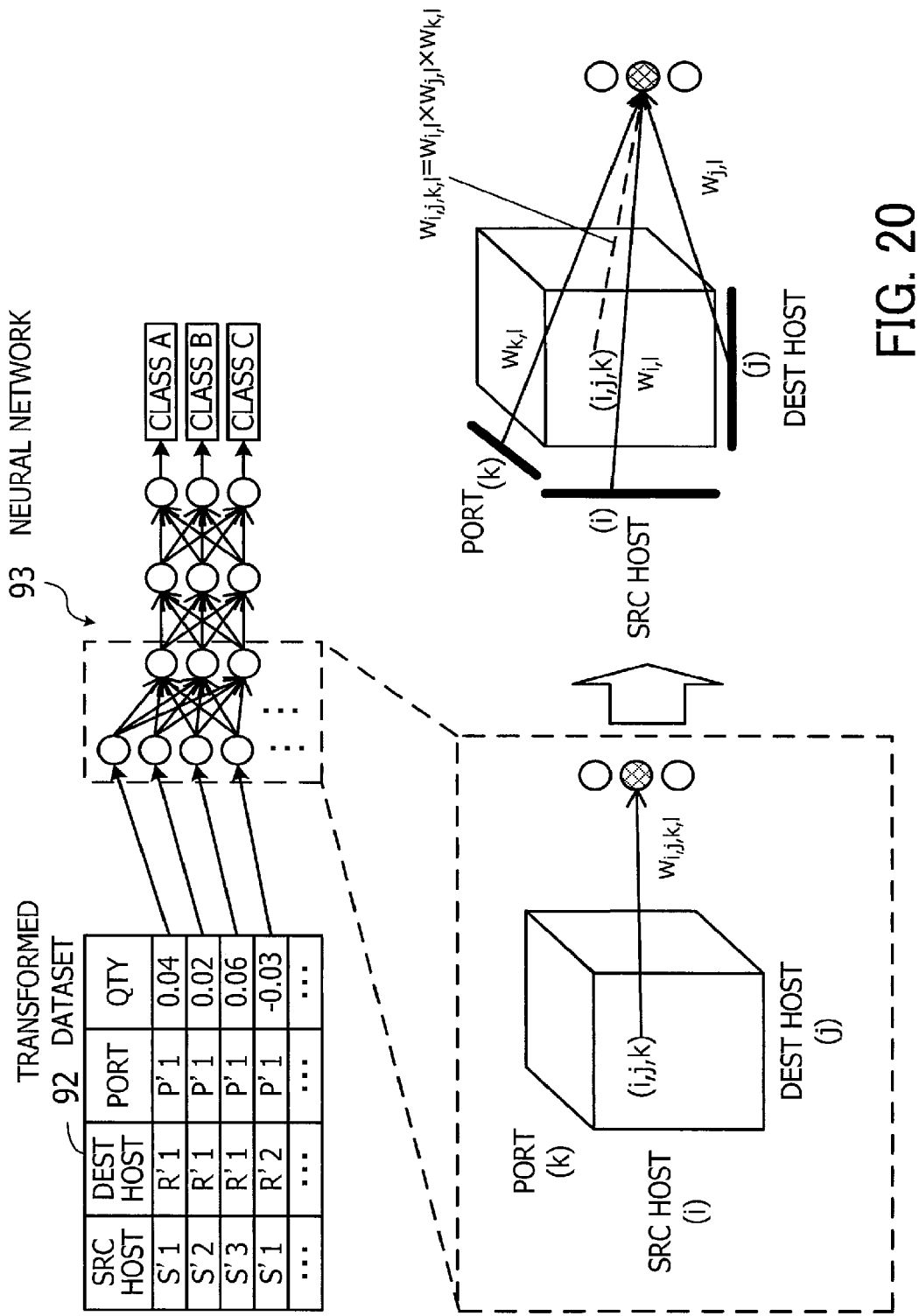
FIG. 20 illustrates an example of reducing the number of parameters assigned to connections between an input layer and a layer immediately following the input layer.

FIG. 20 illustrates an example of reducing the number of parameters assigned to connections between the input layer and a layer immediately following the input layer. The quantity values registered in individual records of the transformed dataset 92 are entered to their corresponding neural units in the input layer of a neural network 93. Each neural unit in the input layer multiplies its entered quantity value by the corresponding parameter and passes the resultant product as inputs to all neurons in the following layer. The second embodiment assumes that the symbol (i, j, k) represents a relationship of a combination made up of the $i^{th}$ source host, the $j^{th}$ destination host, and the $k^{th}$ port, where i, j, and k are all integers greater than or equal to 1. Supposing that the quantity value corresponding to the relationship is entered to the $l^{th}$ neuron in the following layer (l is an integer greater than or equal to 1), the parameter value by which the quantity value is multiplied is denoted by $w_{i,j,k,l}$. The parameter value $w_{i,j,k,l}$ is expressed by the following equation (1).

$$w_{i,j,k,l} = w_{i,l} \times w_{j,l} \times w_{k,l} \tag{1}$$

It is noted that $w_{i,l}$ is a parameter value assigned to a pair consisting of the identifier of the $i^{th}$ source host and the $l^{th}$ neuron in the following layer; is a parameter value assigned to a pair consisting of the identifier of the $j^{th}$ destination host and the $l^{th}$ neuron in the following layer; and $w_{k,l}$ is a parameter value assigned to a pair consisting of the identifier of the $k^{th}$ port and the $l^{th}$ neuron in the following layer.

As seen in the above equation (1), the parameter value $w_{i,j,k,l}$ to be learned is expressed by a product of multiple parameter values $w_{i,l}$, $w_{j,l}$, and $w_{k,l}$. That is, parameters between the input layer and the following layer are represented using fewer parameters, thereby successfully preventing overtraining.

Suppose that the transformed dataset 92 contains m terms associated with one another, where m is an integer greater than or equal to 1. Further supposing that the number of variable values of the individual terms is respectively denoted by $I_1, \ldots, I_m$ and the following layer includes L neurons, where $I_1, \ldots, I_m$ and L are all integers greater than or equal to 1, the number of parameters between the input layer and the following layer is obtained by $I_1 \times L + \ldots + I_m \times L$. In the case where the transformed dataset 92 indicates relationships among ten source hosts, ten destination hosts, and ten ports and the following layer includes ten neurons, the number of parameters between the input layer and the following layer is 300 (10×10+10×10+10×10=300).

The reduction in the number of parameters does not cause loss of characteristics important for the data classification in the case where an input dataset includes a large number of groups each made up of strongly correlated variable values of respective terms, and patterns of relationships of variable values between such groups are important characteristics for the data classification. Therefore, the above-described strategy significantly reduces the number of parameters and thereby avoids overtraining, without compromising the classification accuracy.

Figure 21:
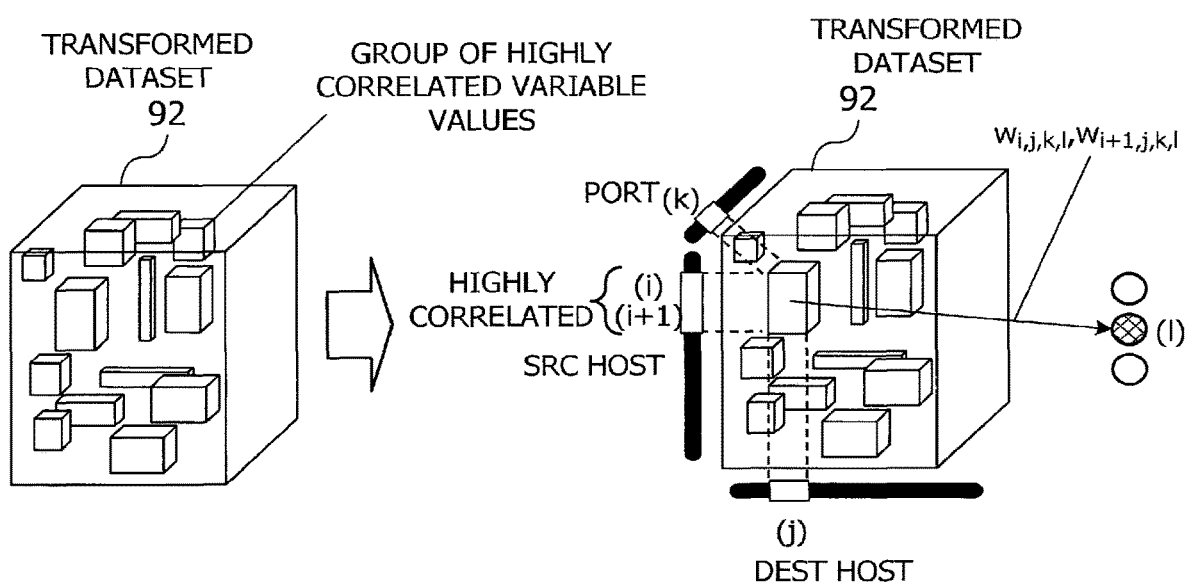
FIG. 21 illustrates an example of reflecting characteristics important for data classification in representations with fewer parameters.

FIG. 21 illustrates an example of reflecting characteristics important for data classification in representations with fewer parameters. The square pillars in FIG. 21 represent groups each made up of strongly correlated variable values in the transformed dataset 92. As can be seen in FIG. 21, the transformed dataset 92 has a structure where groups of strongly correlated variable values are intricately related to one another.

To classify data, how groups each made up of strongly correlated variable values exist in the transformed dataset 92 may be emphasized as important characteristics. This is the case, for example, with data classification according to patterns of a cyber-attack of some sort. Such characteristics appear as square pillars in the transformed dataset 92 as illustrated in FIG. 21. That is, the distribution of square pillars indicating the groups of strongly correlated variable values in the transformed dataset 92 presents important characteristics for data classification.

Suppose, for example, that both the $i^{th}$ source host and the $(i+1)^{th}$ source host in the transformed dataset frequently communicate with the $j^{th}$ destination host through the $k^{th}$ port on the $j^{th}$ destination host. That is, the $i^{th}$ source host and the $(i+1)^{th}$ source host are strongly correlated with each other. In this case, a weight for an input into the $l^{th}$ neuron in the following layer is calculated by the above equation (1).

If the parameters $w_{i,l}$, $w_{i+1,l}$, $w_{j,l}$, and $w_{k,l}$ after learning take larger values than others, the characteristic of this group of highly correlated variable values is preserved without loss. That is, when each parameter assigned to a relationship indicated by a record in the transformed dataset in relation to a neuron in the following layer is represented by the product representation defined in equation (1), characteristics indicating relationships between groups of strongly correlated variable values are preserved without loss. Thus, it is possible to represent, for example, the relationship where both the $i^{th}$ and $(i+1)^{th}$ source hosts frequently communicate with the $j^{th}$ destination host through the $k^{th}$ port, using a fewer number of parameters.

As can be seen from the above description, the second embodiment employs the parameter representation defined in equation (1) when an input dataset includes a large number of groups each made up of strongly correlated variable values of respective terms, and patterns of relationships of variable values between such groups are important characteristics for the data classification. The values of the parameters on the right-hand side of equation (1) are then learned by a neural network, which leads to a significant reduction in the number of parameters and thus avoids overtraining of the neural network, without loss of characteristics important for the data classification.

The following part of the description explains a machine learning process in which measures against overtraining are implemented.

Figure 22:
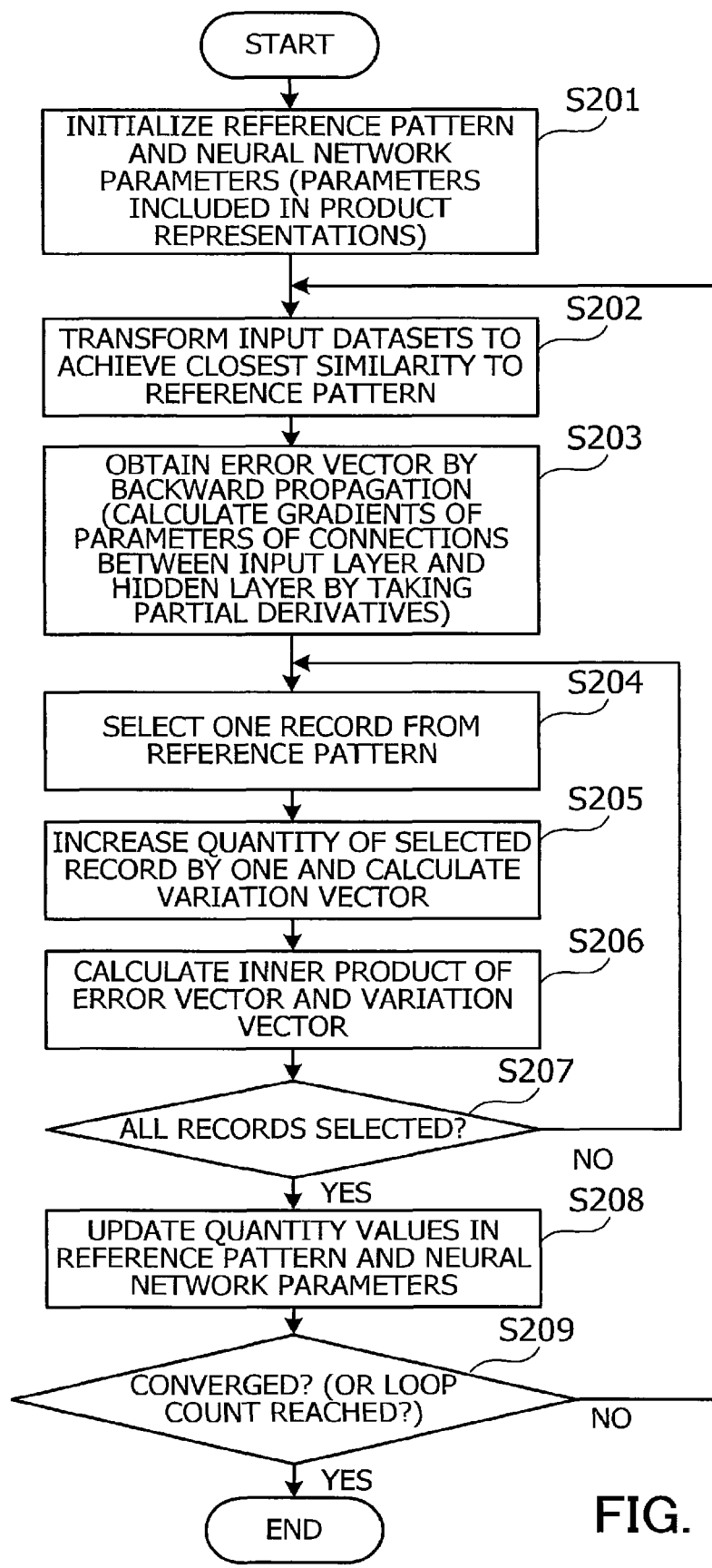
FIG. 22 is an example of a flowchart illustrating a machine learning process in which measures against overtraining a neural network are implemented.

FIG. 22 is an example of a flowchart illustrating a machine learning process in which measures against overtraining a neural network are implemented. Each operation in FIG. 22 is described below in the order of step numbers.

(Step S201) The training unit 140 initializes a reference pattern and parameters in a neural network. Amongst the parameters to be initialized, parameters corresponding to numerical values fed from the input layer into neurons in a layer immediately following the input layer are individually defined by the product representation indicated in equation (1), and therefore the parameters on the right-hand side of equation (1) are the targets of the initialization.

Figure 23:
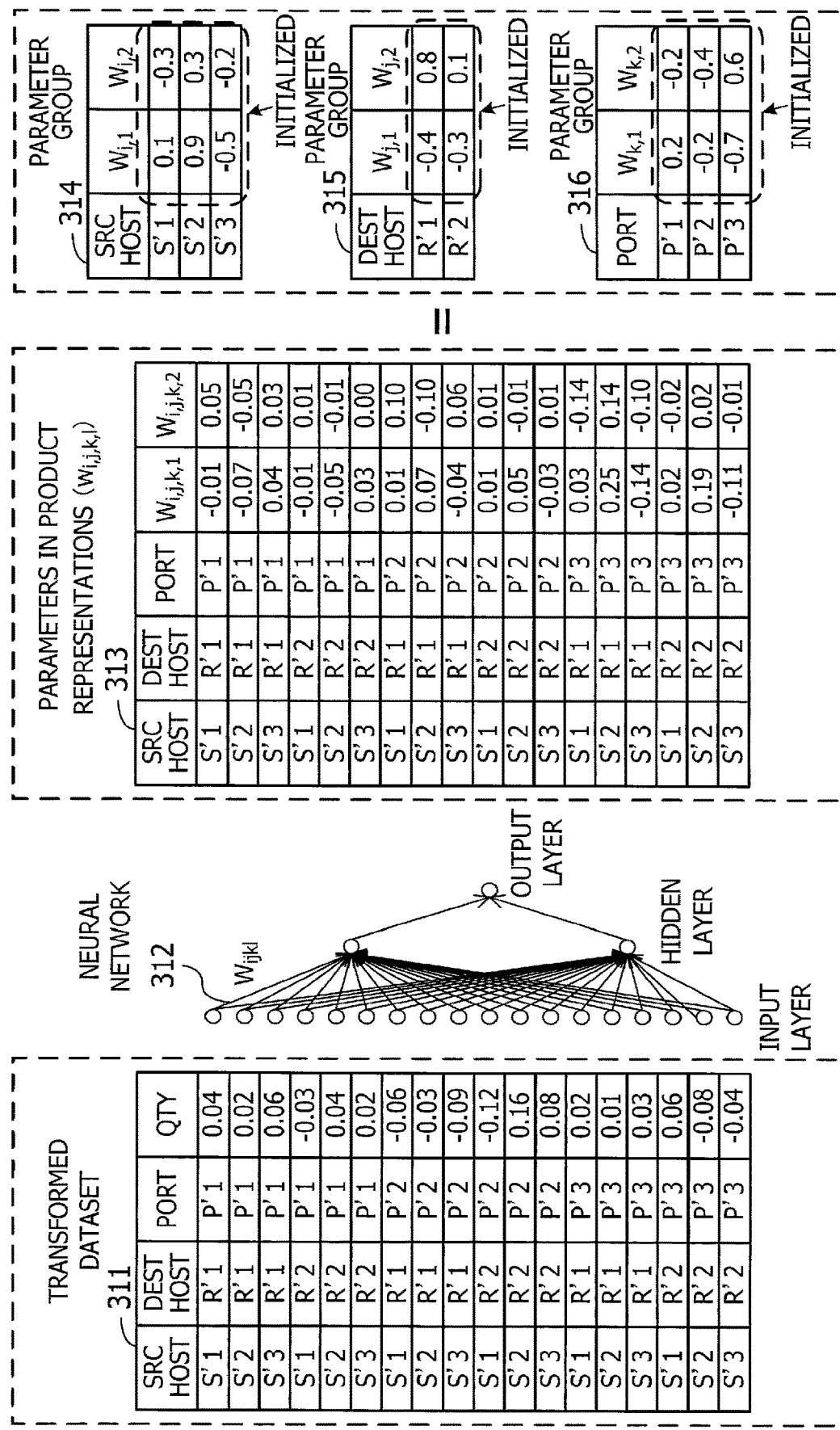
FIG. 23 illustrates an example of parameter initialization.

FIG. 23 illustrates an example of parameter initialization. Referring to the example of FIG. 23, an illustrated transformed dataset 311 includes three terms named "Source Host" (SRC HOST), "Destination Host" (DEST HOST), and "Port" (PORT), which have three, two, and three variable values, respectively. Therefore, there are eighteen combination patterns of the variable values of the three terms (3×2×3=18), and the transformed dataset 311 thus includes eighteen records individually corresponding to the combination patterns. Each of the eighteen records includes a quantity value indicating the appearance frequency of its corresponding combination pattern.

The input layer of an illustrated neural network 312 has as many neural units as the number of records in the transformed dataset 311. Right after the input layer is a hidden layer with two neurons. The output of each neuron in the hidden layer is fed into a single neuron in the output layer.

In this case, the training unit 140 initializes respective parameters in three parameter groups 314 to 316. The parameter group 314 includes parameters each assigned to a specific one of the variable values, representing the source hosts, in relation to a specific one of the neurons in the hidden layer. The parameter group 315 includes parameters each assigned to a specific one of the variable values, representing the destination hosts, in relation to a specific one of the neurons in the hidden layer. The parameter group 316 includes parameters each assigned to a specific one of the variable values, representing the ports, in relation to a specific one of the neurons in the hidden layer. For example, the training unit 140 initializes each parameter in the three parameter groups 314 to 316 to a randomly generated value.

Based on the three parameter groups 314 to 316, the training unit 140 generates parameters 313 in product representations. Referring to the example of FIG. 23, thirty-six parameters 313 in product representations are generated based on sixteen parameters included in the parameter groups 314 to 316.

Now refer back to FIG. 22.

(Step S202) The training unit 140 transforms an input dataset in such a way that it will have the closest similarity to the reference pattern, thus generating a transformed dataset.

(Step S203) The training unit 140 performs forward propagation of signals over the neural network 312 and backward propagation of output error, thus obtaining an error vector in the input layer. In the course of this operation, the training unit 140 calculates the gradient of each parameter in the parameter groups 314 to 316 by calculating derivatives with respect to parameters associated with each term (partial derivatives). Then, using the calculated gradients, the training unit 140 updates the parameters in the parameter groups 314 to 316.

Figure 24:
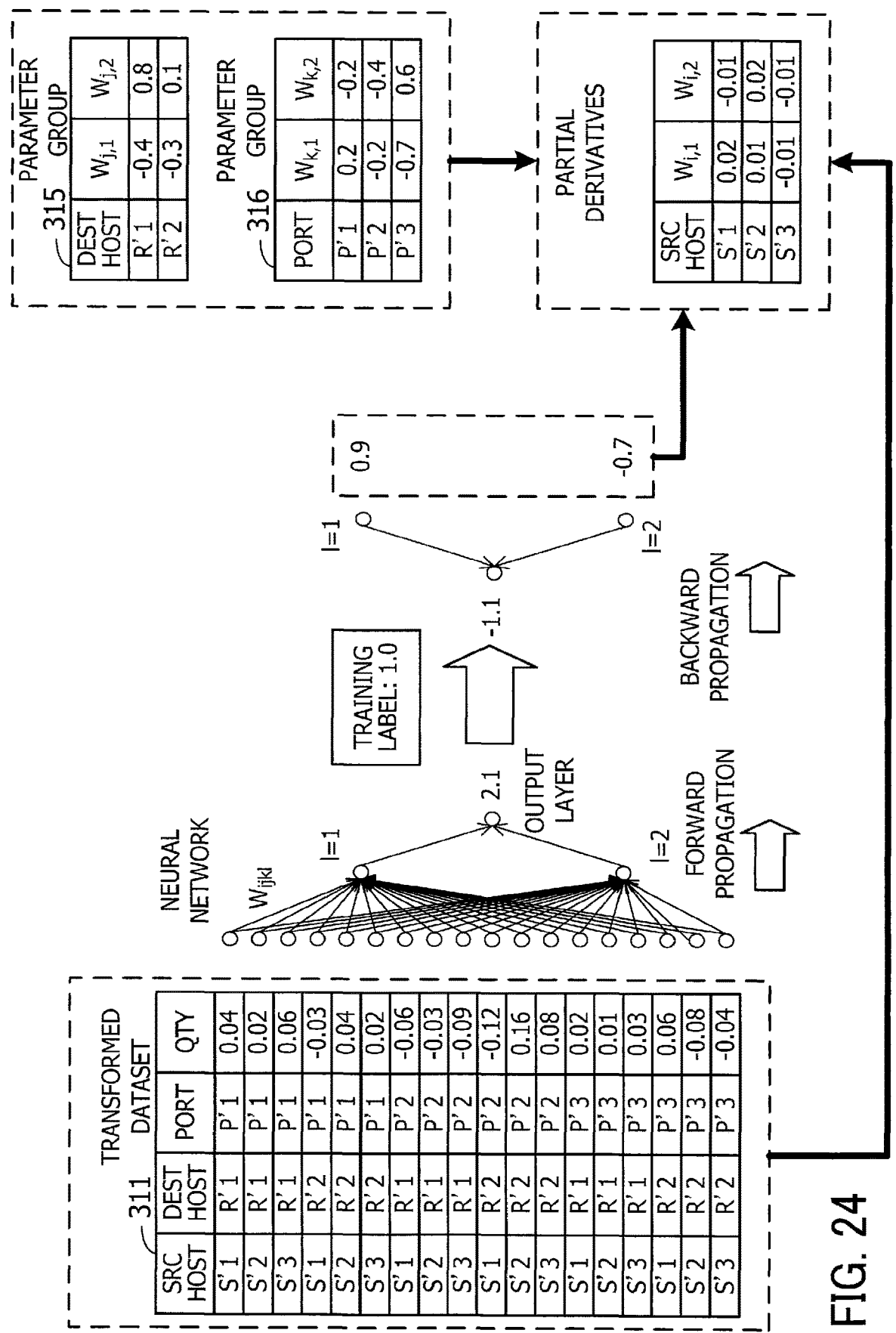
FIG. 24 illustrates an example of calculating partial derivatives with respect to parameters.

FIG. 24 illustrates an example of calculating partial derivatives with respect to parameters. Partial derivatives for a specific term are calculated, for example, based on the transformed dataset 311, parameters associated with terms other than the specific term for the partial derivative calculation, and back-propagated error in the following layer after the input layer. For example, in the case of calculating partial derivatives with respect to the source-host parameter group 314, the destination-host parameter group 315 and the port parameter group 316 are used.

For example, in the calculation of the partial derivatives for the source hosts, the training unit 140 computes a product of the quantity value of each record in the transformed dataset 311 and parameter values corresponding to variable values included in the record, individually found in each of the destination-host parameter group 315 and the port parameter group 316. In the case of a record corresponding to a combination of the source host S'1, the destination host R'1, and the port P'1, for example, the training unit 140 multiplies the quantity value of the record (0.04 in the example of FIG. 1) by the parameter value corresponding to the destination host R'1 and that corresponding to the port P'1. This multiplication operation is performed for each neuron in the hidden layer.

Next the training unit 140 sorts all resulting products obtained from the multiplication of the quantity value of each record in the transformed dataset 311 according to the variable values of the source hosts, and aggregates the products calculated for each variable value representing a source host with respect to each of the neurons in the hidden layer. For example, in the case of finding the partial integral independently on the source host S'1, the training unit 140 aggregates the resulting products obtained from the multiplication of the quantity value of each record that includes the source host S'1 in the transformed dataset 311. The aggregating of the resulting products is achieved, for example, by adding up or summing the resulting products. The training unit 140 multiplies the aggregate result for each variable value by back-propagated error corresponding to the output of each of the neurons, thereby obtaining partial derivatives with respect to the individual variable values. The thus-obtained partial derivatives are used to represent a local gradient at each neuron in the hidden layer.

The training unit 140 multiplies, for example, a gradient obtained for each pair of a variable value of a specific term and a neuron in the hidden layer by a predetermined value and then subtracts the resulting product from a parameter value corresponding to the pair. The training unit 140 then updates the parameter value with the thus-obtained value.

Now refer back to FIG. 22.

(Step S204) The training unit 140 selects one pending record out of the reference pattern.

(Step S205) The training unit 140 calculates a variation vector representing quantity variations in the transformed dataset generated from the input dataset with an assumption that the quantity value of the selected record is increased by one.

(Step S206) The training unit 140 calculates an inner product of the error vector obtained in step S203 and the variation vector calculated in step S205. The training unit 140 interprets this inner product as a modification to be made to the selected record.

(Step S207) The training unit 140 determines whether the records in the reference pattern have all been selected. If all records are selected, the process advances to step S208. If any pending record remains, the process returns to step S204.

(Step S208) The training unit 140 updates the quantity values of the reference pattern, as well as the weight parameters of the neural network. For example, the training unit 140 adds the modification values calculated in step S206 to their corresponding quantity values in the reference pattern. The training unit 140 also updates weight parameters with their modified values obtained in the backward propagation.

(Step S209) The training unit 140 determines whether the process has reached its end condition. The process is terminated when such end conditions are met. Otherwise, the process returns to step S202 to repeat the above processing.

As can be seen from the above description, it is possible to perform machine learning with a reduced number of parameters between the input layer and the hidden layer, thereby successfully preventing overtraining.

It is noted that the above-described overtraining prevention of the second embodiment is implemented when an input dataset includes a large number of groups each made up of strongly correlated variable values of respective terms, and patterns of relationships of variable values between such groups are important characteristics for the data classification. In this case, while the overtraining prevention is implemented, it is ensured to find a reference pattern and parameters allowing existence of groups of strongly correlated variable values in a transformed dataset to be passed along individual neurons.

Figure 25:
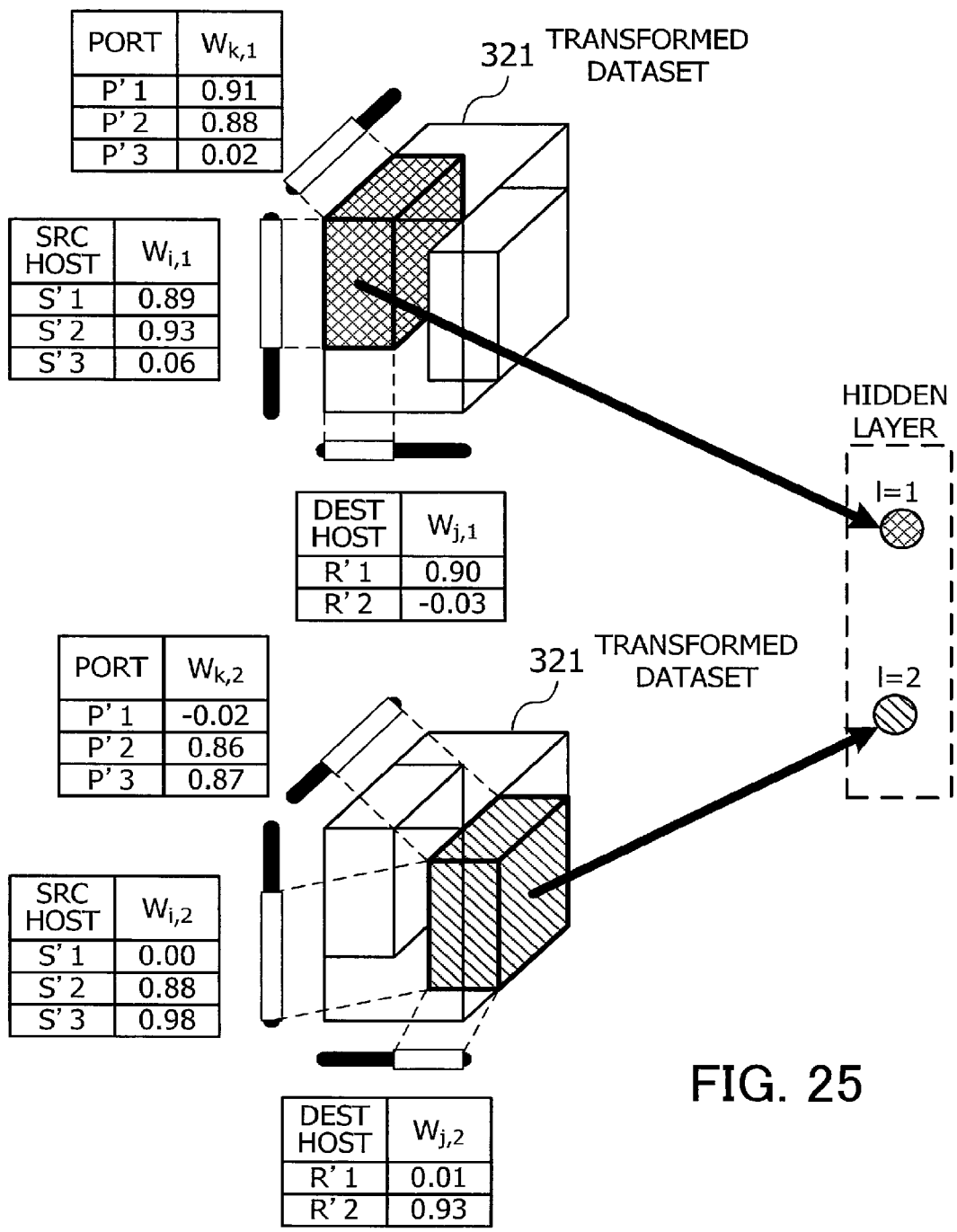
FIG. 25 illustrates an example of parameters obtained by learning.

FIG. 25 illustrates an example of parameters obtained by learning. Referring to a transformed dataset 321 illustrated in FIG. 25, in a combination of the source hosts S'1 and S'2, the destination host R'1, and the ports P$^1$1 and P'2, the source hosts S'1 and S'2 strongly correlate with each other and the ports P$^1$1 and P'2 also strongly correlate with each other. In this case, as learning of the neural network proceeds, each group of strongly correlated variable values is indicated by parameters assigned to each of the strongly correlated variable values in relation to the same single neuron in the hidden layer (the first neuron in the example of FIG. 25).

For example, amongst parameters assigned to each of the source-host variable values in relation to the first neuron in the hidden layer, parameters assigned to the source hosts S'1 and S'2 included in the group of strongly correlated variable values take large values while a parameter assigned to the source host S'3 not belonging to the group takes a small value. Similarly, amongst parameters assigned to each of the destination-host variable values in relation to the first neuron in the hidden layer, parameters assigned to the destination host R'1 included in the group of strongly correlated variable values takes a large value while a parameter assigned to the destination host R'2 not belonging to the group takes a small value. Further, amongst parameters assigned to each of the port variable values in relation to the first neuron in the hidden layer, parameters assigned to the ports P$^1$1 and P'2 included in the group of strongly correlated variable values take large values while a parameter assigned to the port P'3 not belonging to the group takes a small value.

Referring again to the transformed dataset 321, in a combination of the source hosts S'2 and S'3, the destination host R'2, and the ports P'2 and P'3, the source hosts S'2 and S'3 strongly correlate with each other and the ports P'2 and P'3 also strongly correlate with each other. In this case, as learning of the neural network proceeds, a group of strongly correlated variable values is indicated by parameters assigned to each of the strongly correlated variable values in relation to the same single neuron in the hidden layer (the second neuron in the example of FIG. 25).

For example, amongst parameters assigned to each of the source-host variable values in relation to the second neuron in the hidden layer, parameters assigned to the source hosts S'2 and S'3 included in the group of strongly correlated variable values take large values while a parameter assigned to the source host S'1 not belonging to the group takes a small value. Similarly, amongst parameters assigned to each of the destination-host variable values in relation to the second neuron in the hidden layer, parameters assigned to the destination host R'2 included in the group of strongly correlated variable values takes a large value while a parameter assigned to the destination host R'1 not belonging to the group takes a small value. Further, amongst parameters assigned to each of the port variable values in relation to the second neuron in the hidden layer, parameters assigned to the ports P'2 and P'3 included in the group of strongly correlated variable values take large values while a parameter assigned to the port P'1 not belonging to the group takes a small value.

As can be seen from the above description, characteristics of groups of highly correlated variable values are incorporated into the neural network even though the number of parameters to be learned is reduced. Because the reduction in the number of parameters does not cause loss of the characteristics important for the data classification, it is possible to prevent a reduction in the classification accuracy of the neural network.

(c) Other Embodiments

The foregoing second embodiment is directed to an application of machine learning for classifying communication logs, where the order of input values affects the accuracy of classification. But that is not the only case of order-sensitive classification. For example, chemical compounds may be classified by their structural properties that are activated regardless of locations of the structure. Accurate classification of compounds would be achieved if it is possible to properly order the input data records with reference to a certain reference pattern.

Figure 26:
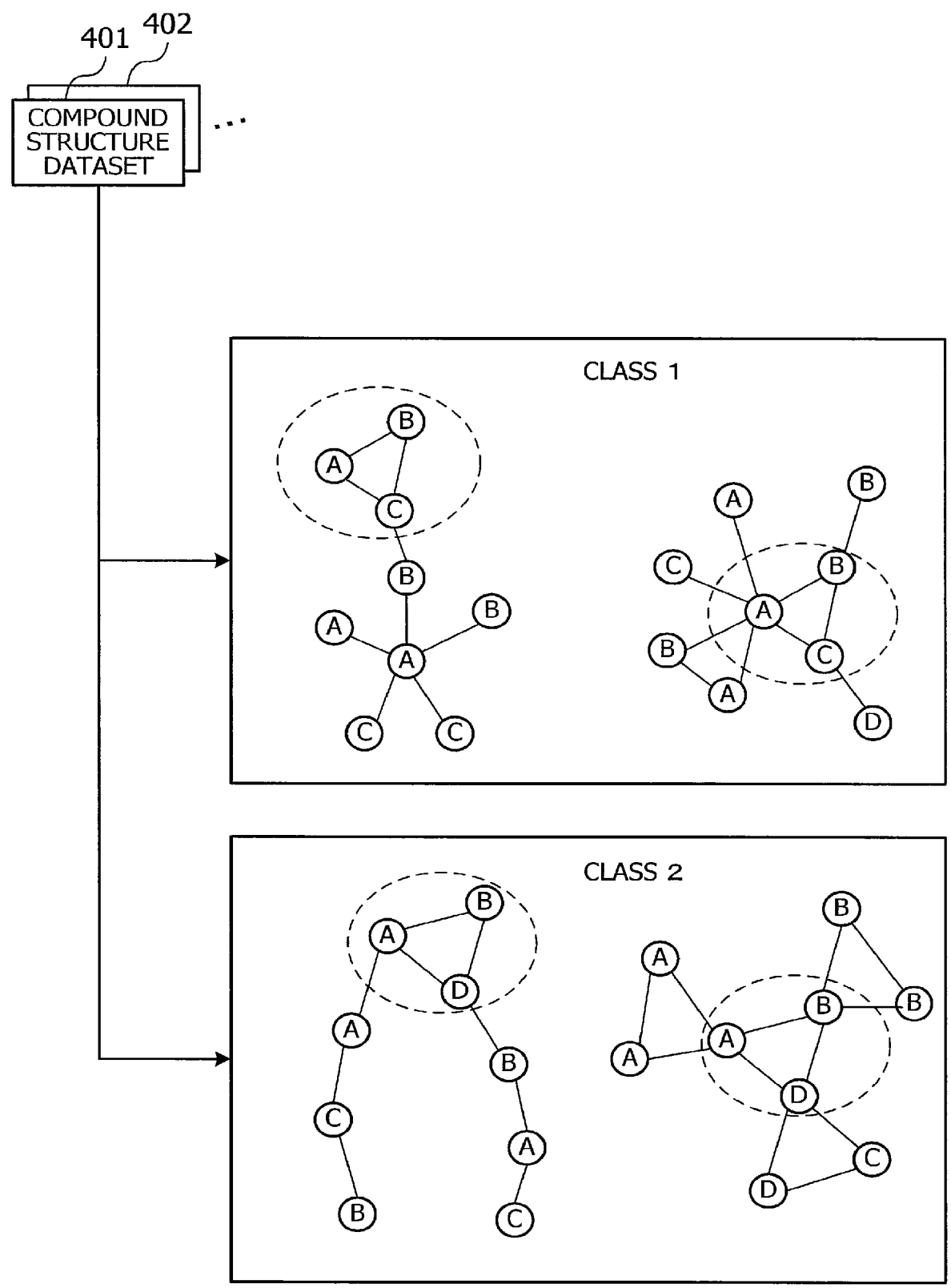
FIG. 26 illustrates an example of classification of compounds.

FIG. 26 illustrates an example of classification of compounds. This example assumes that a plurality of compound structure datasets 401, 402, . . . are to be sorted in accordance with their functional features. Each compound structure dataset 401, 402, . . . is supposed to include multiple records that indicate relationships between two constituent substances in a compound.

Classes 1 and 2 are seen in FIG. 18 as an example of classification results. The broken-line circles indicate relationships of substances that make a particularly considerable contribution to the classification, and such relationships may appear regardless of the entire structure of variable-to-variable relationships. A neural network may be unable to classify compound structure datasets 401, 402, . . . properly if such relationships are ordered inappropriately. This problem is solved by determining an appropriate order of relationships in the compound structure datasets 401, 402, . . . using a reference pattern optimized for accuracy. It is therefore possible to classify compounds in a proper way even in the case where the location of active structures is not restricted.

According to an aspect, it is possible to improve classification accuracy of a neural network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a machine learning program that causes a computer to execute a process comprising:
   obtaining an input dataset including a plurality of numerical values and a training label indicating a correct classification result corresponding to the input dataset;
   determining an input order of the plurality of numerical values based on a reference pattern, by associating each of the plurality of numerical values with one of combination patterns of respective variable values of a plurality of terms, the reference pattern including an array of reference values to provide a criterion for ordering the plurality of numerical values to be entered to a neural network, the reference values being associated one-to-one with the combination patterns;
   determining second parameter values based on first parameter values each assigned to one of the respective variable values of each of the plurality of terms in relation to each neuron in a layer immediately following an input layer of the neural network, the second parameter values being assigned one-to-one to the combination patterns in relation to each neuron in the immediately following layer, each of the second parameter values serving as a weight value to be applied to a numerical value associated with the corresponding combination pattern when the numerical value is entered to the corresponding neuron in the immediately following layer, and being represented by a product of first parameter values each assigned to one of the respective variable values included in the combination pattern in relation to the neuron in the immediately following layer;
   calculating an output value of the neural network with the plurality of numerical values arranged in the input order, by use of the second parameter values;
   calculating an input error in each of the input layer and the immediately following layer, based on a difference between the output value and the correct classification result indicated by the training label; and
   updating the reference values in the reference pattern and the first parameter values based on the input error in each of the input layer and the immediately following layer.

2. The non-transitory computer-readable storage medium according to claim 1, wherein:
   in the input dataset, the plurality of numerical values is associated one-to-one with combination patterns of respective input variable values of the plurality of terms, and two or more input variable values of one of the plurality of terms correlate with each other in terms of numerical values associated with combination patterns each including one of the two or more input variable values.

3. The non-transitory computer-readable storage medium according to claim 2, wherein:
   the determining of input order includes adopting, as the input order, an order of numerical values obtained by transforming each of the input variable values into one of the variable values used in the reference pattern and then rearranging combination patterns of the transformed variable values based on the reference pattern.

4. A machine learning method comprising:
obtaining an input dataset including a plurality of numerical values and a training label indicating correct classification result corresponding to the input dataset;
determining, by a processor, an input order of the plurality of numerical values based on a reference pattern, by associating each of the plurality of numerical values with one of combination patterns of respective variable values of a plurality of terms, the reference pattern including an array of reference values to provide a criterion for ordering the plurality of numerical values to be entered to a neural network, the reference values being associated one-to-one with the combination patterns;
determining, by the processor, second parameter values based on first parameter values each assigned to one of the respective variable values of each of the plurality of terms in relation to each neuron in a layer immediately following an input layer of the neural network, the second parameter values being assigned one-to-one to the combination patterns in relation to each neuron in the immediately following layer, each of the second parameter values serving as a weight value to be applied to a numerical value associated with the corresponding combination pattern when the numerical value is entered to the corresponding neuron in the immediately following layer, and being represented by a product of first parameter values each assigned to one of the respective variable values included in the combination pattern in relation to the neuron in the immediately following layer;
calculating, by the processor, an output value of the neural network with the plurality of numerical values arranged in the input order, by use of the second parameter values;
calculating, by the processor, an input error in each of the input layer and the immediately following layer, based on a difference between the output value and the correct classification result indicated by the training label; and
updating the reference values in the reference pattern and the first parameter values based on the input error in each of the input layer and the immediately following layer.

5. A machine learning apparatus comprising:
a memory that stores therein a reference pattern that includes an array of reference values to provide a criterion for ordering a plurality of numerical values to be entered to a neural network, the reference values being associated one-to-one with combination patterns of respective variable values of a plurality of terms; and
a processor configured to execute a process including:
obtaining an input dataset including the plurality of numerical values and a training label indicating a correct classification result corresponding to the input dataset and determining an input order of the plurality of numerical values included in the input dataset by associating each of the plurality of numerical values with one of the combination patterns based on the reference pattern,
determining second parameter values based on first parameter values each assigned to one of the respective variable values of each of the plurality of terms in relation to each neuron in a layer immediately following an input layer of the neural network, the second parameter values being assigned one-to-one to the combination patterns in relation to each neuron in the immediately following layer, each of the second parameter values serving as a weight value to be applied to a numerical value associated with the corresponding combination pattern when the numerical value is entered to the corresponding neuron in the immediately following layer, and being represented by a product of first parameter values each assigned to one of the respective variable values included in the combination pattern in relation to the neuron in the immediately following layer,
calculating an output value of the neural network with the plurality of numerical values arranged in the input order, by use of the second parameter values,
calculating an input error in each of the input layer and the immediately following layer, based on a difference between the output value and the correct classification result indicated by the training label, and
updating the reference values in the reference pattern and the first parameter values based on the input error in each of the input layer and the immediately following layer.

* * * * *